(12) United States Patent
Harada et al.

(10) Patent No.: US 7,793,083 B2
(45) Date of Patent: Sep. 7, 2010

(54) PROCESSOR AND SYSTEM FOR SELECTIVELY DISABLING SECURE DATA ON A SWITCH

(75) Inventors: Masaaki Harada, Hyogo (JP); Tsutomu Sekibe, Hyogo (JP)

(73) Assignee: Panasonic Corporation, Osaka (JP)

( * ) Notice: Subject to any disclaimer, the term of this patent is extended or adjusted under 35 U.S.C. 154(b) by 765 days.

(21) Appl. No.: 11/667,762

(22) PCT Filed: Nov. 24, 2005

(86) PCT No.: PCT/JP2005/021614
§ 371 (c)(1),
(2), (4) Date: May 15, 2007

(87) PCT Pub. No.: WO2006/057316
PCT Pub. Date: Jun. 1, 2006

(65) Prior Publication Data
US 2008/0052534 A1    Feb. 28, 2008

(30) Foreign Application Priority Data
Nov. 26, 2004   (JP) .............................. 2004-342197

(51) Int. Cl.
G06F 7/38      (2006.01)
G06F 9/00      (2006.01)
G06F 9/44      (2006.01)
G06F 15/00     (2006.01)

(52) U.S. Cl. ..................................... 712/229
(58) Field of Classification Search ................... 712/229
See application file for complete search history.

(56) References Cited

U.S. PATENT DOCUMENTS

| 6,282,657 | B1* | 8/2001 | Kaplan et al. ................... 726/1 |
| 6,292,874 | B1* | 9/2001 | Barnett ....................... 711/153 |
| 2003/0126458 | A1 | 7/2003 | Teramoto et al. | |
| 2003/0140245 | A1 | 7/2003 | Dahan et al. | |
| 2004/0105298 | A1 | 6/2004 | Symes | |
| 2004/0153672 | A1* | 8/2004 | Watt et al. ................... 713/201 |
| 2005/0198442 | A1* | 9/2005 | Mandler ..................... 711/145 |

FOREIGN PATENT DOCUMENTS

| EP | 1 073 051 | 1/2001 |
| JP | 2001-43139 | 2/2001 |
| JP | 2002-202720 | 7/2002 |
| WO | 2004/046934 | 6/2004 |
| WO | 2005/121979 | 12/2005 |

* cited by examiner

OTHER PUBLICATIONS

AMBA AXI Protocol v1.0 Specification.

*Primary Examiner*—Eddie P Chan
*Assistant Examiner*—Corey Faherty
(74) *Attorney, Agent, or Firm*—Wenderoth, Lind & Ponack, L.L.P.

(57) ABSTRACT

A processor (10) manages, in an instruction management unit (103) and a data attribute management unit (105), secure attributes indicating whether instruction code and data stored in an instruction cache (102) and a data cache (104) of the processor (10) are confidential information. When the instruction code and the data are confidential information, the processor (10) also manages secure processing identification information for indicating in which secure process the confidential information is to be used. When the operating mode is switched from the secure mode to the normal mode, only the confidential information is disabled by a memory disabling unit (108). This prevents confidential information from being analyzed by the processor in the normal mode.

3 Claims, 20 Drawing Sheets

130

| ADDRESS | READ-DATA SECURE ATTRIBUTE | |
|---|---|---|
| | SECURE ATTRIBUTE | SECURE PROCESSING IDENTIFICATION INFORMATION |
| 0x8000AAA0 | secure | 1 | — 131
| 0x80001000 | normal | | — 132
| 0x8000BBB0 | secure | 1 | — 133
| 0x80003000 | normal | | — 134
| 0x80004000 | normal | | — 135
| 0x8000CCC0 | secure | 2 | — 136
| 0x80006000 | normal | | — 137
| 0x8000FFF0 | secure | 2 | — 138

(LINE NUMBER)

| 0x8000AAA0 | code_0 | 0 |
|---|---|---|
| 0x80001000 | code_1 | 1 |
| 0x8000BBB0 | code_2 | 2 |
| 0x80003000 | code_3 | 3 |
| 0x80004000 | code_4 | 4 |
| 0x8000CCC0 | code_5 | 5 |
| 0x80006000 | code_6 | 6 |
| 0x8000FFF0 | code_7 | 7 |

FIG. 3

| ADDRESS | READ-DATA SECURE ATTRIBUTE ||
|---|---|---|
| | SECURE ATTRIBUTE | SECURE PROCESSING IDENTIFICATION INFORMATION |
| 0x8000AAA0 | secure | 1 |
| 0x80001000 | normal | |
| 0x8000BBB0 | secure | 1 |
| 0x80003000 | normal | |
| 0x80004000 | normal | |
| 0x8000CCC0 | secure | 2 |
| 0x80006000 | normal | |
| 0x8000FFF0 | secure | 2 |

(LINE NUMBER)
                                                                  0
| 0x80001000 | code_1 |                                           1
|            |        |                                           2
| 0x80003000 | code_3 |                                           3
| 0x80004000 | code_4 |                                           4
|            |        |                                           5
| 0x80006000 | code_6 |                                           6
|            |        |                                           7

102

US 7,793,083 B2

PROCESSOR AND SYSTEM FOR SELECTIVELY DISABLING SECURE DATA ON A SWITCH

TECHNICAL FIELD

The present invention relates to a processor and system that perform secure processing, and in particular to technology for realizing a secure mechanism in a system LSI.

BACKGROUND ART

In recent years, digital AV devices perform various types of processing such as downloading content via a network, and storing and playing back content. Mechanisms for protecting copyrights of content in such devices have therefore become important.

There is disclosure of technology for implementing security in a processor, as a method of realizing content copyright protection in a digital AV device. The following describes this technology.

A processor core includes a secure mode for performing license management, content decryption, etc., and a normal mode for performing normal processing, and the secure mode and normal mode are switched between each other as processing is performed. When the processor accesses a bus slave module having a secure resource, such as an external memory, the processor core sends, to a bus interface, a mode status signal indicating whether the processor core is operating in the secure or normal mode, and the bus interface attaches a mode indicated by the mode status signal to an access request for the bus slave module, as a secure attribute. Accordingly, the bus slave module judges the secure attribute, and permits access to the secure resource if the secure attribute indicates "secure".

Patent document 1: Japanese Patent Application Publication No. 2002-202720

DISCLOSURE OF THE INVENTION

Problems Solved by the Invention

In a case of the processor core switching between the secure and normal modes while operating as mentioned above, in order to prevent instruction code and data that have been fetched while operating in the secure mode from being analyzed by the processor core when in the normal mode, the fetched instruction code and data are disabled, thereby being placed in an unreadable condition before reverting to the normal mode.

However, all of the instruction code and data fetched while operating in the secure mode is not necessarily information that must be made confidential, but instead includes information that can be used in the normal mode as well. In other words, since the instruction code that is in an instruction cache and was fetched in the secure mode is disabled during the mode switch even if it is instruction code to be used in the normal mode as well, such instruction code cannot be read after reversion to the normal mode, and a cache miss-hit occurs. The processing performance of the processor therefore drops after reversion to the normal mode.

The present invention has been achieved in light of the above problem, and an aim thereof is to provide a secure processing system and a processor that switch between a secure mode and a normal mode while operating, and in which there is no drop in the processing performance of the processor after reversion from the secure mode to the normal mode.

Means to Solve the Problems

In order to achieve the above aim, the present invention is a processor that, during operation, switches between a secure mode of performing processing with use of secure information and non-secure information and a normal mode of performing processing with use of the non-secure information, the processor including: an internal memory operable to have stored therein a plurality of secure information pieces and non-secure information pieces acquired from an external memory, a plurality of attribute information pieces each corresponding to a different stored information piece and indicating whether the corresponding information piece is one of the secure information pieces or the non-secure information pieces, and a plurality of processing specification information pieces each corresponding to a different one of the stored secure information pieces and being for specifying in which of a plurality of secure processes the corresponding secure information piece is to be used; and a disabling unit operable to, before a switch in a case of switching from the secure mode to the normal mode, specify, according to the attribute information pieces, a secure information piece from among the secure information pieces and non-secure information pieces stored in the internal memory, and disable the specified secure information piece.

Effects of the Invention

According to this structure, the processor specifies and disables only secure information before reverting to the normal mode, thereby reverting to the normal mode in a condition in which only non-secure information remains in the internal memory. Accordingly, after reversion to the normal mode, the processor can use the non-secure information stored in the internal memory without accessing the external memory, thereby enabling the processor to continue processing without a drop in processing performance.

Furthermore, this structure enables the processor to specify the secure information with the use of attribute information. Also, when returning to the normal mode, the processor can specify the secure information without needing to perform complicated processing since the attribute information is in association with the information stored in the internal memory and indicates whether the information is secure information or non-secure information.

Moreover, this structure enables the processor to perform secure processing in accordance with the processing specification information.

The present invention is also a processor including: an internal memory operable to have stored therein a plurality of secure instruction code pieces and non-secure instruction code pieces acquired from an external memory; an execution unit operable to decode the secure instruction code pieces and the non-secure instruction code pieces, and perform execution thereof; and a bus access control unit operable to, in a case of a bus access being necessary due to the execution unit executing secure instruction code, attach an access request secure attribute to the bus access, the access request secure attribute indicating that the bus access pertains to the execution of the secure instruction code.

According to this structure, even though a secure mode for performing secure processing is not provided, the processor can issue, to a bus slave module, a bus access that has an access request secure attribute indicating that the bus access pertains to the execution of secure processing. A bus slave module that has a secure resource is provided with a mechanism for permitting access to the secure resource only if an access request secure attribute indicating security is received from the processor, which is a bus master. This enables the processor, which does not include the secure mode, to use the secure resource of the external bus slave module.

Here, the internal memory may have further stored therein a plurality of attribute information pieces each corresponding to a different stored instruction code piece and indicating whether the corresponding instruction code piece is one of the secure instruction code pieces or the non-secure instruction code pieces, and the bus access control unit may read, from among the secure instruction code pieces and the non-secure instruction code pieces stored in the internal memory, an instruction code piece and the corresponding attribute information piece, and attach the read attribute information piece to the bus access as the access request secure attribute.

This structure enables the processor to determine, with use of the attribute information, whether the instruction code to be executed is secure instruction code or non-secure instruction code.

Here, the internal memory may be a cache memory that manages information in cache line units, and may manage each of the attribute information pieces in a different cache line unit of the cache memory.

According to this structure, given that secure instruction code and non-secure instruction code is managed in cache line units, the processor can attach an access request secure attribute to bus access pertaining to the execution of instruction code to be kept truly confidential.

Here, the internal memory may have further stored therein a plurality of processing specification information pieces each corresponding to a different one of the stored secure instruction code pieces and being for specifying in which of a plurality of secure processes the corresponding secure instruction code piece is to be used, and in a case of reading a secure instruction code piece from among the secure instruction code pieces in the internal memory, the bus access control unit may further read, along with the corresponding attribute information piece, the processing specification information piece corresponding to the read secure instruction code piece, and attach the attribute information piece and the processing specification information piece that were read to the bus access as the access request secure attribute.

This structure enables the processor to perform secure processing in accordance with the processing specification information.

Also, the present invention is a secure processing system including: an external memory including a secure area composed of a plurality of sub-secure areas, and operable to store a plurality of secure information pieces and non-secure information pieces, the secure information pieces being stored in the secure area; a memory interface including a read unit operable to read an information piece from the external memory, a position information storage unit operable to have stored therein sub-secure area position information for specifying a position of each of the sub-secure areas, a judgment unit operable to, according to the sub-secure area position information, judge whether the information piece read by the read unit is one of the secure information pieces or the non-secure information pieces, and if the read information piece is one of the secure information pieces, also judge from which of the sub-secure areas the information piece has been read, and an attribute information generation unit operable to, if the read information piece has been judged to be one of the secure information pieces, generate attribute information indicating security, and generate specification information for specifying the sub-secure area in which the read information piece was stored, and if the read information piece has been judged to be one of the non-secure information pieces, generate attribute information indicating non-security; and a processor that, during operation, switches between a secure mode of performing secure processing with use of secure information and non-secure information and a normal mode of performing processing with use of the non-secure information, the processor including an internal memory operable to have stored therein the plurality of secure information pieces and non-secure information pieces acquired from the external memory, and a disabling unit operable to, before a switch in a case of switching from the secure mode to the normal mode, specify a secure information piece from among the secure information pieces and non-secure information pieces stored in the internal memory, by referencing the attribute information received from the memory interface, and disable the specified secure information piece.

According to this structure, the processor specifies and disables only secure information before reverting to the normal mode, thereby reverting to the normal mode in a condition in which only non-secure information remains in the internal memory. Accordingly, after reversion to the normal mode, the processor can use the non-secure information stored in the internal memory without accessing the external memory, thereby enabling the processor to continue processing without a drop in processing performance.

Furthermore, this structure enables the memory interface to easily distinguish between secure information and non-secure information since the position where the secure information is stored on the external memory is known in advance.

Moreover, according to this structure, the processor can recognize, according to the information generated by the memory interface and for specifying the sub-secure areas, in which secure process information the information is to be used since the secure area of the external memory is composed of a plurality of sub-secure areas, and pieces of instruction code and data to be used in specified secure processing are stored in different sub-secure areas.

Also, the present invention is a secure processing system including: an external memory operable to have stored therein a plurality of secure instruction code pieces, secure data pieces, non-secure instruction code pieces, and non-secure data pieces; a memory interface operable to read an instruction code piece from the external memory, judge whether the read instruction code piece is one of the secure instruction code pieces or the non-secure instruction code pieces, generate attribute information according to a result of the judgment, and output the read instruction code piece and the generated attribute information to a processor; and the processor including an internal memory operable to have stored therein the plurality of secure instruction code pieces and non-secure instruction code pieces acquired from an external memory, an execution unit operable to decode the secure instruction code pieces and the non-secure instruction code pieces, and perform execution thereof, and a bus access control unit operable to, in a case of a bus access being necessary due to the execution unit executing secure instruction code, attach an access request secure attribute to the bus access, the access request secure attribute indicating that the bus access pertains to the execution of the secure instruction code.

According to this structure, even though a secure mode for performing secure processing is not provided, the processor can issue, to a bus slave module, a bus access that has an access request secure attribute indicating that the bus access pertains to the execution of secure processing. A bus slave module that has a secure resource is provided with a mechanism for permitting access to the secure resource only if an access request secure attribute indicating security is received from the processor, which is a bus master. This enables the processor, which does not include the secure mode, to use the secure resource of the external bus slave module.

Here, the external memory may include a secure area composed of a plurality of sub-secure areas, and store the secure instruction code pieces and the secure data pieces in the secure area, and the memory interface may include a read unit operable to read an instruction code piece from the external memory, a position information storage unit operable to have stored therein sub-secure area position information for specifying a position of each of the sub-secure areas, a judgment unit operable to, according to the sub-secure area position information, judge whether the instruction code piece read by the read unit is one of the secure instruction code pieces or the non-secure instruction code pieces, and if the read instruction code piece is one of the secure instruction code pieces, also judge from which of the sub-secure areas the instruction code piece has been read, and an attribute information generation unit operable to, if the read instruction code piece has been judged to be one of the secure instruction code pieces, generate attribute information indicating security, and generate specification information for specifying the sub-secure area in which the read instruction code piece was stored, and if the read instruction code piece has been judged to be one of the non-secure instruction code pieces, generate attribute information indicating non-security.

This structure enables the memory interface to easily distinguish between secure instruction code and non-secure instruction code since the position, where the secure instruction code is stored on the external memory is known in advance.

Moreover, according to this structure, the processor can recognize, according to the information generated by the memory interface and for specifying the sub-secure areas, in which secure process information the information is to be used since the secure area of the external memory is composed of a plurality of sub-secure areas, and pieces of instruction code and data to be used in specified secure processing are stored in different sub-secure areas.

BRIEF DESCRIPTION OF THE DRAWINGS

FIG. 2 shows an instruction cache 102;
FIG. 3 shows a data structure of an attribute management table 130 managed by an instruction attribute management unit 103;
FIG. 4 shows the instruction cache 102 after disabling processing has been performed by a memory disabling unit 108.

FIG. 16 is a flowchart showing overall operations of the secure processing system 2 pertaining to an instruction fetch performed by a processor core 101a;
FIG. 19 is a flowchart showing operations of a secure module 60a;
and
FIG. 20 illustrates bus access and secure attributes with use of a concrete example of the secure module 60a.

Figure 1:
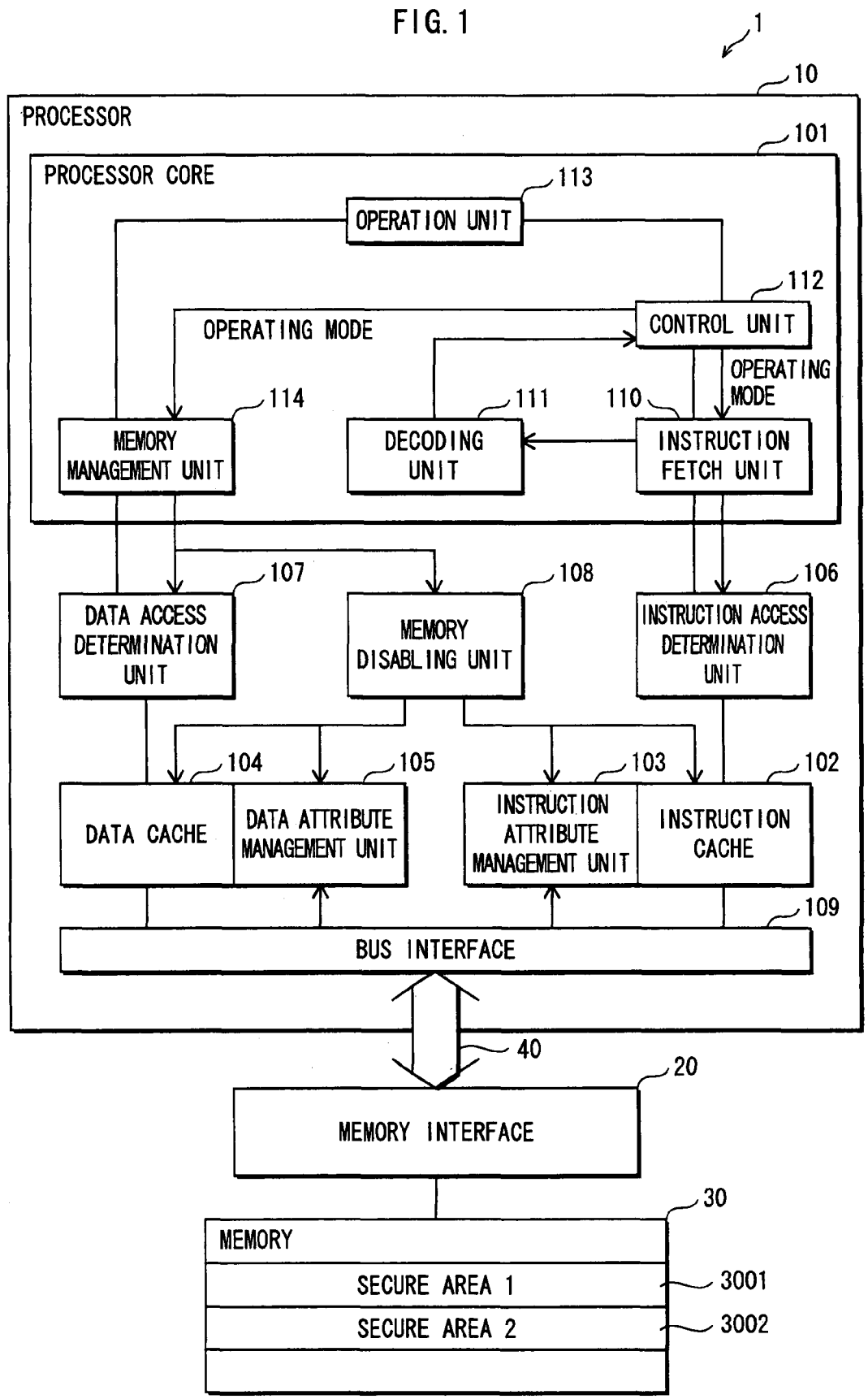
FIG. 1 shows a structure of a secure processing system

DESCRIPTION OF THE CHARACTERS 1 secure processing system
2 secure processing system
10 processor
10a processor
20 memory interface
20a memory interface
30 memory
30a memory
40 bus
40a bus
50a bus
60a secure module

BEST MODE FOR CARRYING OUT THE INVENTION

Embodiments of the present invention are described in detail below with reference to the drawings.

Embodiment 1

The following describes a secure processing system 1 as embodiment 1 pertaining to the present invention.

Structure

FIG. 1 shows an internal structure of the secure processing system 1. As shown in the figure, the secure processing system 1 includes a processor 10, a memory interface 20, a memory 30, and a bus 40. The secure processing system 1 is mounted in specifically an AV device or the like.

1. Processor 10

FIG. 1 shows a functional structure of the processor 10. As shown in the figure, the processor 10 includes a processor core 101, an instruction cache 102, an instruction attribute management unit 103, a data cache 104, a data attribute management unit 105, an instruction access determination unit 106, a data access determination unit 107, a memory disabling unit 108, and a bus interface 109.

(1) Processor Core 101

The processor core 101 has two operating modes, namely a normal mode and a secure mode, and switches between the two operating modes while performing processing. The secure mode is a mode in which the processor 10 performs secure processing such as encryption/decryption processing, license processing, and the like. On the other hand, the normal mode is a mode in which the processor 10 performs all other non-secure processing. Note that details of technology for implementing the secure mode for performing secure processing have been omitted since the secure mode is realizable by previously known technology.

As shown in FIG. 1, the processor core 101 includes an instruction fetch unit 110, a decoding unit 111, a control unit 112, an operation unit 113, and a memory management unit 114.

The instruction fetch unit 110 periodically receives, from the control unit 112, a signal showing the operating mode of the processor core 101. The instruction fetch unit 110 also issues, to the instruction access determination unit 106, an instruction indicating a fetch of instruction code, an access request including an address of the instruction code, and an access request secure attribute. The access request secure attribute is generated according to the operating mode of the processor core 101. Specifically, the instruction fetch unit 110 generates "normal" as the access request secure attribute when the operating mode-indicating signal received from the control unit 112 indicates "normal mode", and generates "secure" as the access request secure attribute when the signal received from the control unit 112 indicates "secure mode".

The instruction fetch unit 110 also acquires instruction code from the memory 30 or the instruction cache 102, and stores the acquired instruction code in a prefetch queue. Note that there are cases in which secure processing identification information is attached to the instruction code acquired by the instruction fetch unit 110. The secure processing identification information indicates in which kind of secure processing the acquired instruction code is to be used. The secure processing identification information attached to the instruction code is notified to the operation unit 113 via the control unit 112.

The decoding unit 111 includes a decoder and an instruction queue. The decoder reads the instruction code from the prefetch queue of the instruction fetch unit 110, decodes the read instruction code to generate low-level code. The instruction queue stores the generated low-level code until a request is received from the control unit 112.

The control unit 112 receives the low-level code from the instruction queue, interprets the received low-level code, and sends instructions to the units of the processor core 101.

The control unit 112 also manages whether the processor core 101 is operating in the secure mode or the normal mode, and periodically outputs a signal indicating the operating mode to the instruction fetch unit 110 and the memory management unit 114. Furthermore, in a case of the operating mode of the processor core 101 switching from the secure mode to the normal mode, the control unit 112 notifies the reversion from the secure mode to the normal mode to the memory disabling unit 108 via the memory management unit 114. The control unit 112 switches the operating mode from the secure mode to the normal mode upon receiving, from the memory disabling unit 108 via the memory management unit 114, a notification that disabling processing performed on the cache has been completed.

The operation unit 113 executes instructions and performs arithmetic operations and logical operations. If a data fetch is requested when executing an instruction, the operation unit 113 computes an address, and outputs the computed address to the memory management unit 114.

Note that if secure processing identification information is attached to the data and the instruction code acquired by the operation unit 113, the operation unit 113 performs processing based on the attached secure processing identification information. Specifically, in the present embodiment, the secure processing identification information is a value of 1 or 2, where instruction code and data with a value of 1 attached is to be used in license management processing, and instruction code and data with a value of 2 attached is to be used in key generation processing.

The memory management unit 114 periodically receives the signal indicating the operating mode of the processor core 101 from the control unit 112. Also, upon receiving the data address from the operation unit 113, the memory management unit 114 issues, to the data access determination unit 107, an instruction indicating a data fetch, an access request including an address of the data, and an access request secure attribute. The access request secure attribute is generated according to the operating mode of the processor core 101. Specifically, the memory management unit 114 generates "normal" as the access request secure attribute when the operating mode-indicating signal received from the control unit 112 indicates "normal mode", and generates "secure" as the access request secure attribute when the signal received from the control unit 112 indicates "secure mode".

The memory management unit 114 also acquires data from the memory 30 or the data cache 104, and outputs the acquired data to the operation unit 113. Note that there are cases in which secure processing identification information is attached to the data acquired by the memory management unit 114. The secure processing identification information indicates in which kind of secure processing the acquired data is to be used.

(2) Instruction Cache 102

The instruction cache 102 is high-speed/low-capacity memory constituted from SRAM (static RAM), and stores instruction code sent from the memory 30. Here, the instruction code includes secure instruction code and non-secure instruction code, details of which are described later. Note that in the present embodiment, the instruction cache 102 includes a cache controller.

FIG. 2 shows the instruction cache 102 in a case of the processor core 101 operating in the secure mode. As shown in the figure, in the instruction cache 102, a code_0 is stored in a line 0, a code_1 is stored in a line 1, a code_2 is stored in a line 2, a code_3 is stored in a line 3, a code_4 is stored in a line 4, a code_5 is stored in a line 5, a code_6 is stored in a line 6, and a code_7 is stored in a line 7. Furthermore, as shown in the figure, the instruction code from code_0 to code_7 is managed in association with addresses.

With each instruction fetch performed by the processor core 101, the instruction cache 102 receives instruction code from the memory 30, and receives a read-data secure attribute from the memory interface 20. Also, upon receiving the instruction code from the memory 30, the instruction cache 102 outputs the corresponding address and read-data secure attribute to the instruction attribute management unit 103.

(3) Instruction Attribute Management Unit 103

The instruction attribute management unit 103 manages the read-data secure attributes of the instruction code stored in each cache line of the instruction cache 102.

FIG. 3 shows a specific example of an attribute management table 130 stored by the instruction attribute management unit 103 when the instruction cache 102 is in the condition shown in FIG. 2. As shown in the figure, the attribute management table 130 includes eight pieces of attribute management information that each correspond to a different cache line of the instruction cache 102, and each of which is composed of an address and a read-data secure attribute. Furthermore, each read-data secure attribute is composed of a secure attribute and secure processing identification information.

The addresses correspond to the addresses of the instruction code stored in the instruction cache 102.

The secure attributes are each set to "secure" or "normal", where "secure" indicates secure instruction code, and "normal" indicates non-secure instruction code. Here, "secure instruction code" refers to confidential instruction code that is used only when the processor core 101 is operating in the secure mode, and "non-secure instruction code" refers to non-confidential instruction code that is used regardless of the operating mode of the processor core 101.

The secure processing identification information is set to a value of 1 or 2 for instruction code whose secure attribute is "secure", where 1 indicates instruction code to be used in license management processing by the processor 10, and 2 indicates instruction code to be used in key generation processing by the processor 10.

Specifically, a piece of attribute management information 131 corresponds to line 0 of the instruction cache 102, and indicates that code_0 identified by an address "0x8000AAA0" is secure instruction code which is to be used in license management processing.

A piece of attribute management information 132 corresponds to line 1 of the instruction cache 102, and indicates that code_1 identified by an address "0x80001000" is non-secure instruction code.

A piece of attribute management information 133 corresponds to line 2 of the instruction cache 102, and indicates that code_2 identified by an address "0x8000BBB0" is secure instruction code which is to be used in license management processing.

A piece of attribute management information 134 corresponds to line 3 of the instruction cache 102, and indicates that code_3 identified by an address "0x80003000" is non-secure instruction code.

A piece of attribute management information 135 corresponds to line 4 of the instruction cache 102, and indicates that code_4 identified by an address "0x80004000" is non-secure instruction code.

A piece of attribute management information 136 corresponds to line 5 of the instruction cache 102, and indicates that code_5 identified by an address "0x8000CCC0" is secure instruction code which is to be used in key generation processing.

A piece of attribute management information 137 corresponds to line 6 of the instruction cache 102, and indicates that code_6 identified by an address "0x80006000" is non-secure instruction code.

A piece of attribute management information 138 corresponds to line 7 of the instruction cache 102, and indicates that code_7 identified by an address "0x8000FFF0" is secure instruction code which is to be used in key generation processing.

With each update of the instruction cache 102 by an instruction fetch performed by the processor core 101, the instruction attribute management unit 103 generates new attribute management information, registers the generated attribute management information in the attribute management table 130, and updates the attribute management table 130.

(4) Data Cache 104

Similarly to the instruction cache 102, the data cache 104 is high-speed/low-capacity memory constituted from SRAM, and stores data sent from the memory 30. Note that similarly to the instruction code, the data includes secure data and non-secure data.

(5) Data Attribute Management Unit 105

The data attribute management unit 105 manages the read-data secure attributes of the data stored in each cache line of the data cache 104.

Specifically, similarly to the instruction attribute management unit 103, the data attribute management unit 105 manages an attribute management table including pieces of attribute management information that each correspond to a different line of the data cache 104. Each piece of attribute management information is composed of an address and a read-data secure attribute that is composed of a secure attribute and secure processing identification information.

The addresses correspond to the addresses of the data stored in the data cache 104.

The secure attributes are each set to "secure" or "normal", where "secure" indicates secure data, and "normal" indicates non-secure data. Here, "secure data" refers to confidential data that is used only when the processor core 101 is operating in the secure mode, and "non-secure data" refers to non-confidential data that is used regardless of the operating mode of the processor core 101.

The secure processing identification information is set to a value of 1 or 2 for data whose secure attribute is "secure", where 1 indicates data to be used in license management processing by the processor 10, and 2 indicates data to be used in key generation processing by the processor 10.

With each update of the data cache 104 by a data fetch performed by the processor core 101, the data attribute management unit 105 generates new attribute management information, registers the generated attribute management information in the attribute management table, and updates the attribute management table.

(6) Instruction Access Determination Unit 106

The instruction access determination unit 106 judges whether instruction code for which there was a cache-hit in instruction code fetch processing performed by the instruction fetch unit 110 of the processor core 101 is readable in the operating mode of the processor core 101 at the time of the cache-hit.

Specifically, secure instruction code can be read only when the processor core 101 is operating in the secure mode. On the other hand, non-secure instruction code can be read whether the processor core 101 is operating in the secure mode or the normal mode.

Accordingly, the instruction access determination unit 106 references, with respect to the instruction code for which there was a cache-hit, the attribute management information managed by the instruction attribute management unit 103, and judges whether the secure attribute included in the read-data secure attribute of such instruction code indicates "secure" or "normal". The instruction access determination unit 106 also judges whether the access request secure attribute output from the processor core 101 is set to "secure" or "normal". The instruction access determination unit 106 performs the aforementioned instruction code-readability determination according to the results of both judgments.

(7) Data Access Determination Unit 107

The data access determination unit 107 judges whether data for which there was a cache-hit in data fetch processing performed by the memory management unit 114 of the processor core 101 is readable in the operating mode of the processor core 101 at the time of the cache-hit.

Specifically, secure data can be read only when the processor core 101 is operating in the secure mode. On the other hand, non-secure data can be read whether the processor core 101 is operating in the secure mode or the normal mode.

Accordingly, similarly to the instruction access determination unit 106, the data access determination unit 107 performs the aforementioned data-readability determination based on the read-data secure attributes managed by the data attribute management unit 105 and the access request secure attribute indicating the operating mode of the processor core 101.

(8) Memory Disabling Unit 108

The memory disabling unit 108 protects secure instruction code held by the instruction cache 102 and secure data held by the data cache 104 when the operating mode of the processor core 101 switches from the secure mode to the normal mode.

More specifically, upon receiving a signal indicating that the operating mode of the processor core 101 will switch from the secure mode to the normal mode from the memory management unit 114 of the processor core 101, the memory disabling unit 108 refers to the attribute management table 130 managed by the instruction attribute management unit 103, and finds cache lines storing instruction code whose secure attribute is set to "secure". According to the attribute management table 130 shown in FIG. 3, the memory disabling unit 108 detects that line 0, line 2, line 5, and line 7 of the instruction cache 102 are storing secure instruction code since the pieces of attribute management information 131, 133, 136, and 138 all include a secure attribute indicating "secure". The memory disabling unit 108 disables the instruction code stored in the found cache lines. Here, the disabling of instruction code refers to disabling access thereto by the processor core 101, and includes methods such as discarding the instruction code or writing a "0" to the cache lines. There are no limitations on the disabling method, and other methods may be used.

FIG. 4 shows a condition of the instruction cache 102 in which only the secure instruction code has been disabled by the memory disabling unit 108. The instruction cache 102 shown in FIG. 4 stores code_1, code_3, code_4, and code_6, whose corresponding secure attributes are all set to "normal", in a readable condition.

The memory disabling unit 108 performs processing on the data cache 104 similarly to as on the instruction cache 102. The memory disabling unit 108 finds cache lines storing data whose secure attribute is set to "secure", and disables the data stored in the found cache lines.

Upon completing the disabling processing performed on the instruction cache 102 and the data cache 104, the memory disabling unit 108 outputs a completion notification to the processor core 101.

(9) Bus Interface 109

The bus interface 109 controls access to the bus 40 by the processor 101.

2. Bus 40

The bus 40 is a communication pathway between the processor 10 and the memory interface 20.

Figure 5:
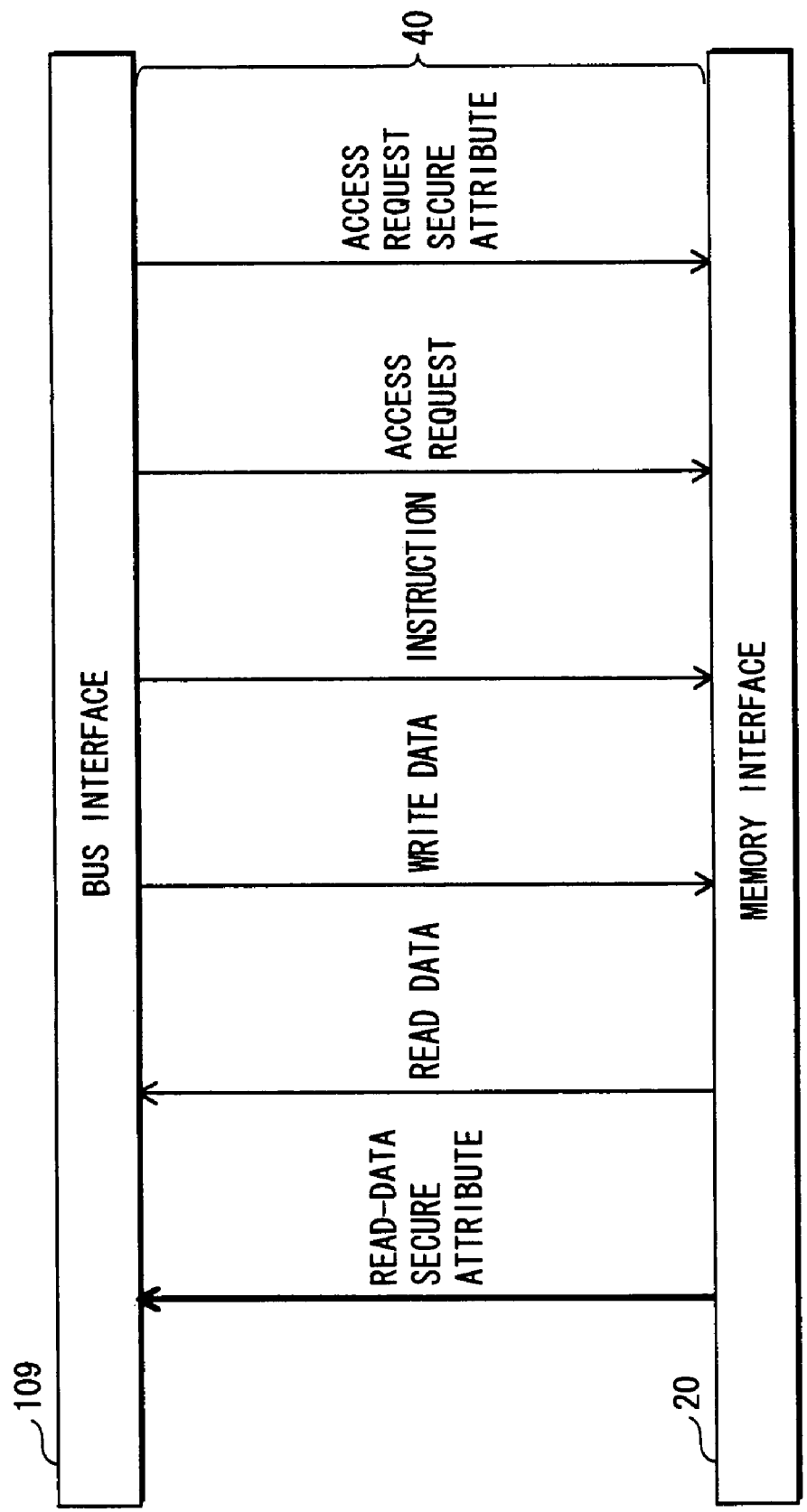
FIG. 5 shows data transmitted and received between a bus interface 109 of a processor 10 and a memory interface 20 by a bus 40.

FIG. 5 shows information that is transmitted and received by the bus 40. As shown in the figure, write data, instructions, access requests, and access request secure attributes are transmitted from the bus interface 109 of the processor 10 to the memory interface 20 via the bus 40. Also, read data and read-data secure attributes are transmitted from the memory interface 20 to the bus interface 109 of the processor 10 via the bus 40.

3. Memory 30

The memory 30 is a storage apparatus constituted from SDRAM, and as shown in FIG. 1, includes a secure area 1 (3001) and a secure area 2 (3002). The secure area 1 (3001) is an area that stores confidential instruction code and confidential data that are used in license management processing performed by the processor 10. The secure area 2 (3002) is an area that stores confidential instruction code and confidential data that are used in key generation processing performed by the processor 10. Note that the secure area 1 (3001) and the secure area 2 (3002) in the present embodiment are, for example, fixed as areas with addresses from 0x8000AAA0 to 0x8000FFFF.

4. Memory Interface 20

The memory interface 20 controls external access to the memory 30.

Figure 6:
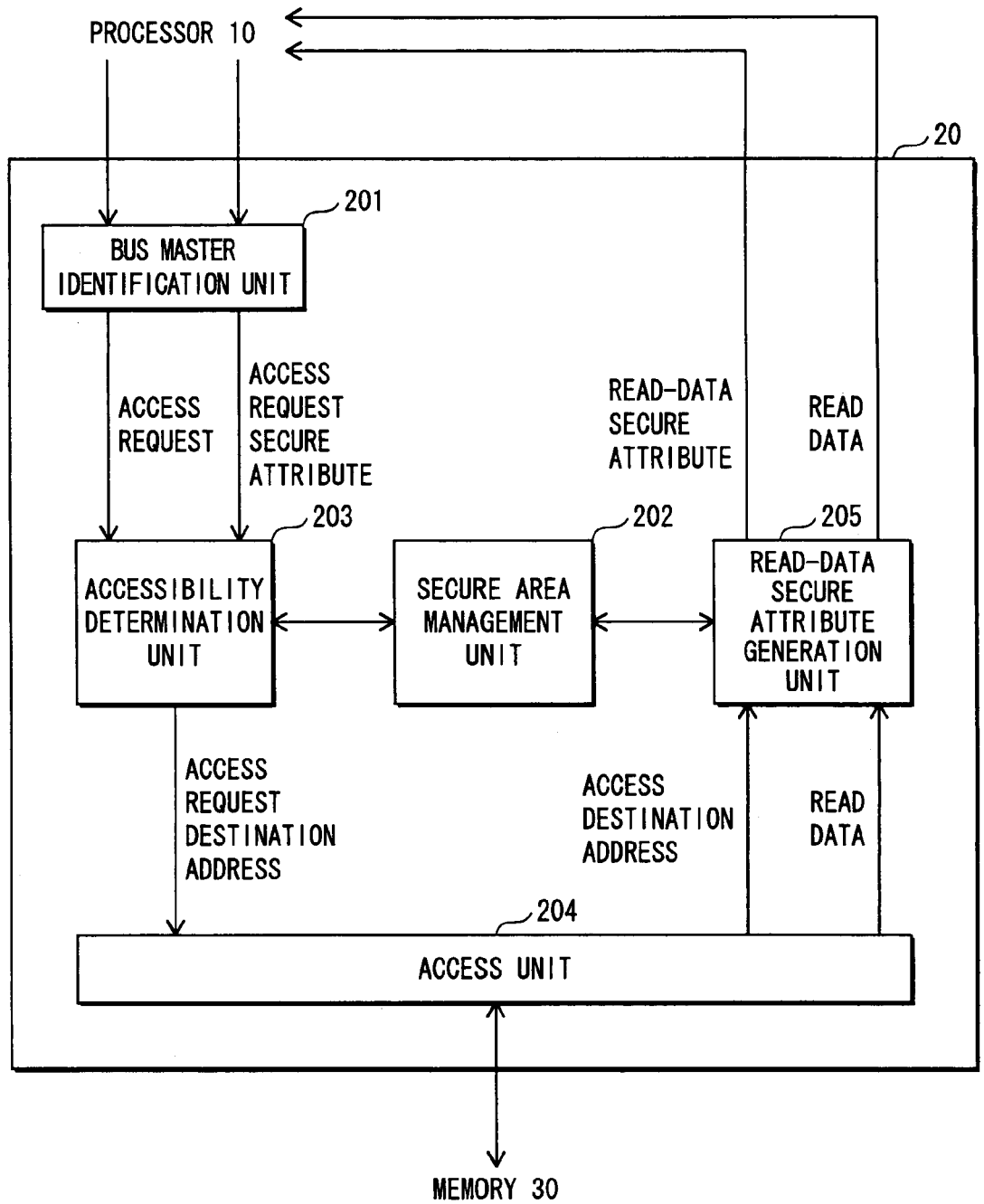
FIG. 6 shows a functional structure of the memory interface 20.

FIG. 6 is a function block diagram showing a functional structure of the memory interface 20. As shown in the figure, the memory interface 20 includes a bus master identification unit 201, a secure area management unit 202, an accessibility determination unit 203, an access unit 204, and a read-data secure attribute generation unit 205.

(1) Bus Master Identification Unit 201

The bus master identification unit 201 receives an access request and an access request secure attribute from the processor 10. Note that in the present embodiment, although only the processor 10 is mentioned as a bus master, the bus master identification unit 201 can identify two or more bus masters other than the processor 10 if access requests to the memory 30 are received from such bus masters. Dedicated ports may be provided for the bus masters as a method for identification thereof.

The bus master identification unit 201 outputs the received access request and access request secure attribute to the accessibility determination unit 203.

(2) Secure Area Management Unit 202

The secure area management unit 202 stores a secure area 1 start address and a secure area 1 end address, which is information for specifying the secure area 1 (3001), and furthermore stores a secure area 2 start address and a secure area 2 end address, which is information for specifying the secure area 2 (3002).

(3) Accessibility Determination Unit 203

Upon receiving the access request and access request secure attribute from the bus master identification unit 201, the accessibility determination unit 201 extracts an access request destination address from the access request. The accessibility determination unit 203 judges whether the processor 10 can access the access request destination address based on the access request secure attribute, the access request destination address, and the information stored in the secure area management unit 202. Details of the determination are described later.

If the access request destination address is determined to be accessible by the processor 10, the accessibility determination unit 203 outputs the access request destination address to the access unit 204. If the access request destination address is determined to not be accessible by the processor 10, the accessibility determination unit 203 ends processing.

(4) Access Unit 204

The access unit 204 receives the access request destination address from the accessibility determination unit 203, and reads instruction code or data from a position in the memory 30 indicated by the received access request destination address. The access unit 204 outputs the read instruction code or data (called "read data") along with an access destination address to the read-data secure attribute generation unit 205. Note that the access destination address is an address that indicates the storage location of the read instruction code, and is the same as the access request destination address received from the accessibility determination unit 203.

(5) Read-Data Secure Attribute Generation Unit 205

Upon receiving the read data and the access destination address from the access unit 204, the read-data secure attribute generation unit 205 reads the secure area 1 start address, the secure area 1 end address, the secure area 2 start address, and the secure area 2 end address that are stored in the secure area management unit 202.

The read-data secure attribute generation unit 205 determines whether the read data has been read from the secure area 1 (3001), the secure area 2 (3002), or another area, based on the addresses read from the secure area management unit 202 and the access destination address received from the access unit 204.

If the read data has been read from the secure area 1 (3001), the read-data secure attribute generation unit 205 sets a secure attribute to "secure", sets a piece of secure processing identification information to 1, and sends, to the processor 10 via the bus 40, the read data and a read-data secure attribute composed of the secure attribute set to "secure" and the secure processing identification information set to 1.

If the read data has been read from the secure area 2 (3002), the read-data secure attribute generation unit 205 sets a secure attribute to "secure", sets a piece of secure processing identification information to 2, and sends, to the processor 10 via the bus 40, the read data and a read-data secure attribute composed of the secure attribute set to "secure" and the secure processing identification information set to 2.

If the read data has been read from an area other than the secure area 1 (3001) and the secure area 2 (3002), the read-data secure attribute generation unit 205 sets a secure attribute to "normal", and sends, to the processor 10 via the bus 40, the read data and the secure attribute set to "normal", without setting a piece of secure processing identification information to any value.

Operations

The following describes operations of the secure processing system 1 with reference to the flowcharts shown in FIG. 7 to FIG. 13.

Here, the operations of the processor core 101 in the secure processing system 1 are described first since the operations of the other constituent elements of the processor 10, and the operations of the memory interface 20, the memory 30, and the bus 40, which are the other constituent elements of the secure processing system 1, are determined according to the operations of the processor core 101. The operations of the other constituent elements, which occur based on the operations of the processor core 101, are described thereafter.

1. Operations of the Processor Core 101

Figure 7:
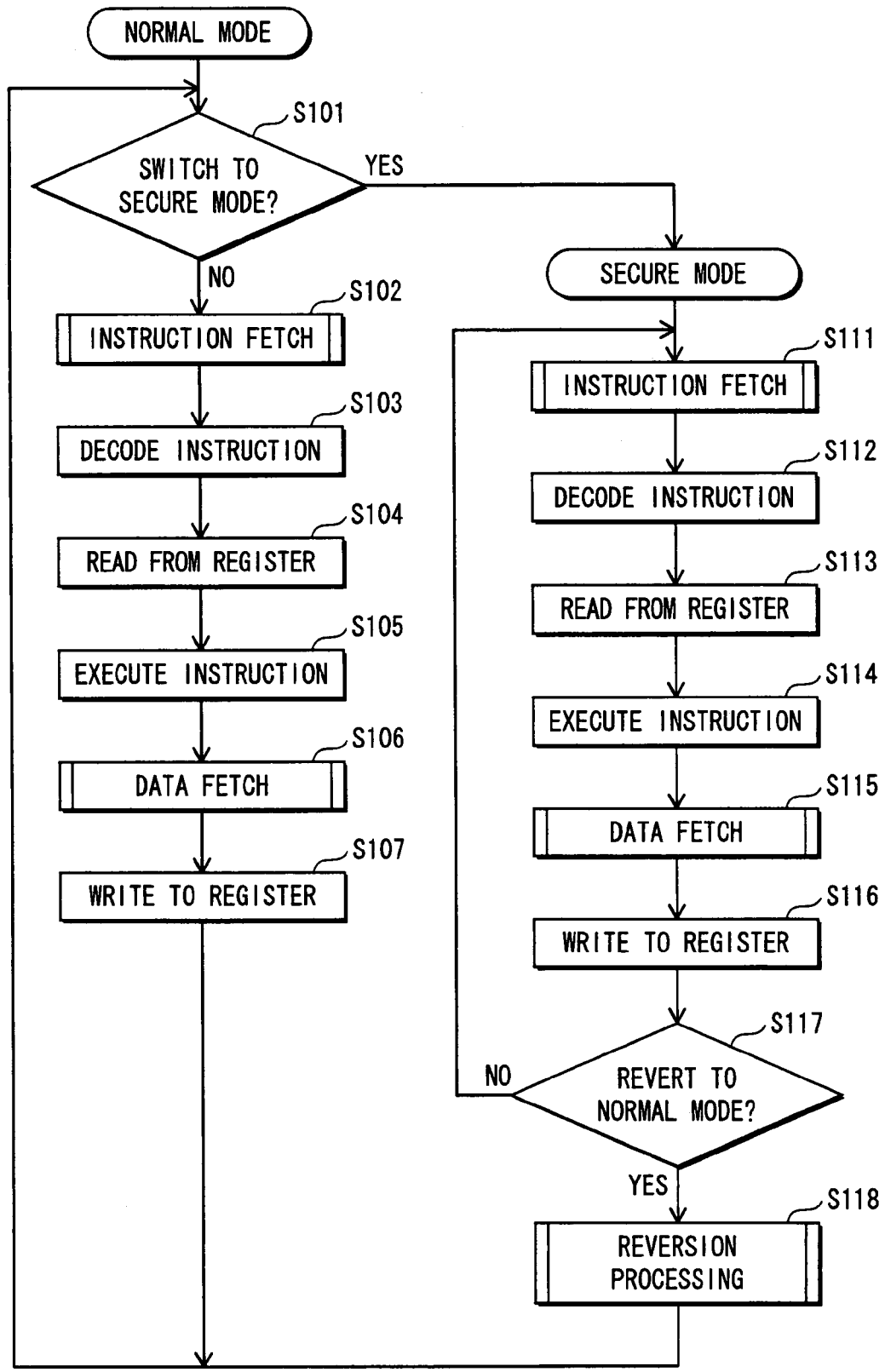
FIG. 7 is a flowchart showing operations of a processor core 101 in the secure processing system 1.

FIG. 7 is a flowchart showing operations of the processor core 101.

While operating in the normal mode, the processor core 101 judges whether a request to switch to the secure mode has been received, and if such a request has not been received (step S101:NO), the processor core 101 performs the operations of step S102 to step S107 in the normal mode.

First, the instruction fetch unit 110 fetches instruction code (step S102), and stores the fetched instruction code in the prefetch queue.

The decoding unit 111 retrieves the instruction code from the prefetch queue, and converts the retrieved instruction code to low-level code. The resulting low-level code is stored in the instruction queue. The control unit 112 receives the low-level code from the instruction queue, and interprets the received low-level code (step S103).

The operation unit 113 reads a register operand from a register file (step S104). The operation unit 113 shifts the operand and generates an ALU result. If the instruction is a load or a store, the operation unit 113 executes the instruction by calculating a memory address or the like (step S105).

If a data access is necessary, the memory management unit 114 accesses the data cache 104 or the memory 30, and reads data therein (step S106).

The operation unit 113 then writes the data loaded from the data cache 104 or the memory 30 and a result generated by the instruction back to the register file (step S107), and the processor core 101 returns to step S101 and continues processing from there.

If a request to switch from the normal mode to the secure mode is received in step S101 (step S101:YES), the processor core 101 switches from the normal mode to the secure mode, and performs the operations of step S111 to step S116 in the secure mode.

First, the instruction fetch unit 110 fetches instruction code (step S111), and stores the fetched instruction code in the prefetch queue.

The decoding unit 111 retrieves the instruction code from the prefetch queue, and converts the retrieved instruction code to low-level code. The resulting low-level code is stored in the instruction queue. The control unit 112 receives the low-level code from the instruction queue, and interprets the received low-level code (step S112).

The operation unit 113 reads a register operand from a register file (step S113). The operation unit 113 shifts the operand and generates an ALU result. If the instruction is a load or a store, the operation unit 113 executes the instruction by calculating a memory address or the like (step S114).

If a data access is necessary, the memory management unit 114 accesses the data cache 104 or the memory 30, and reads data therein (step S115).

The operation unit 113 then writes the data loaded from the data cache 104 or the memory 30 and a result generated by the instruction back to the register file (step S116).

Thereafter, while operating in the secure mode the processor core 101 judges whether a request to revert from the secure mode to the normal mode has been received (step S117). If a request to revert to the normal mode has not been received (step S117:NO), the processor core 101 returns to step S111 and continues processing from there.

If a request to revert to the normal mode has been received (step S117:YES), the processor core 101 performs reversion processing (step S118), returns to step S101, and continues processing from there.

2. Instruction Fetch Processing

Figure 8:
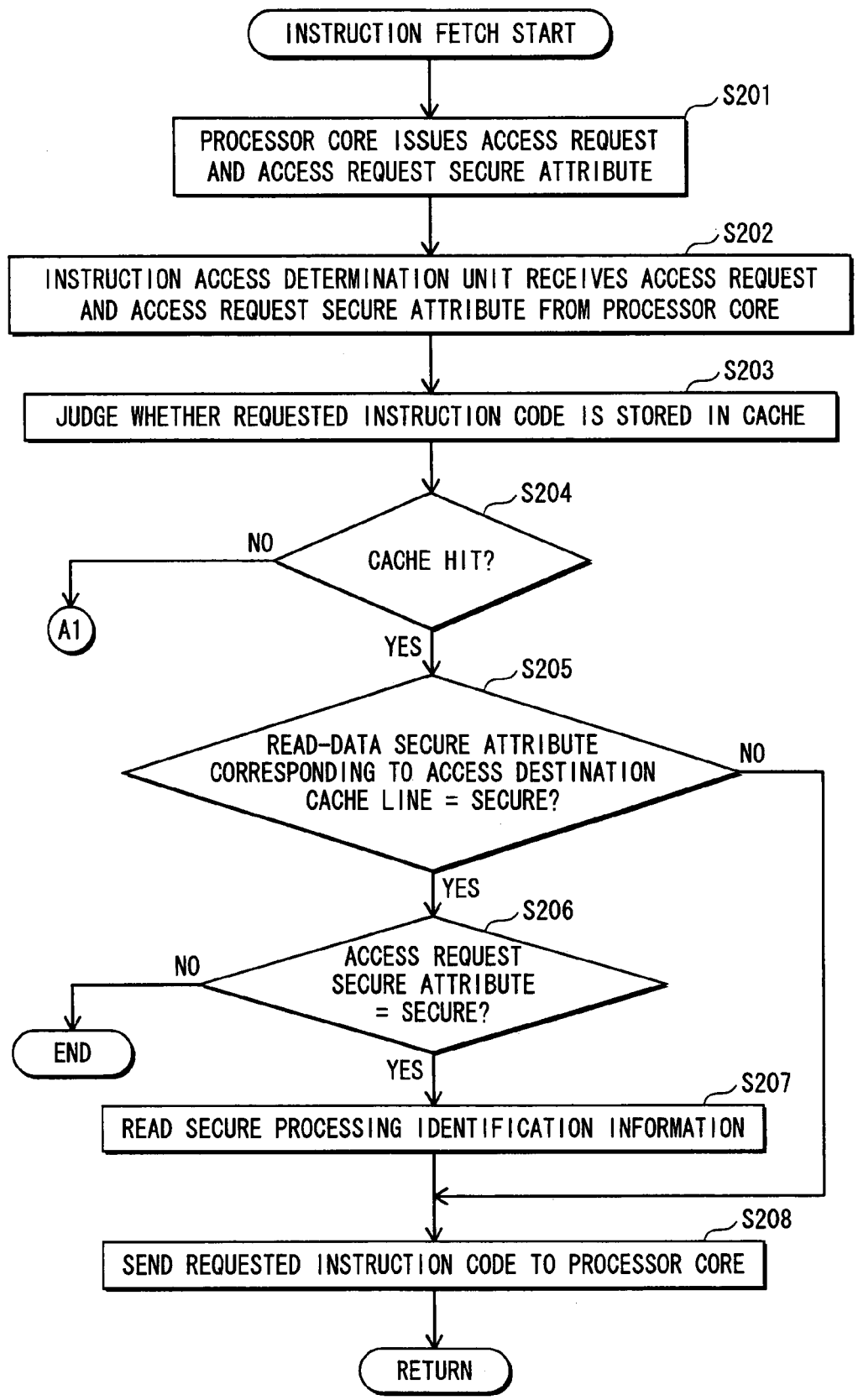
FIG. 8 is a flowchart showing overall operations of the secure processing system 1 pertaining to an instruction fetch performed by the processor core 101, continued in FIG. 9.
Figure 9:
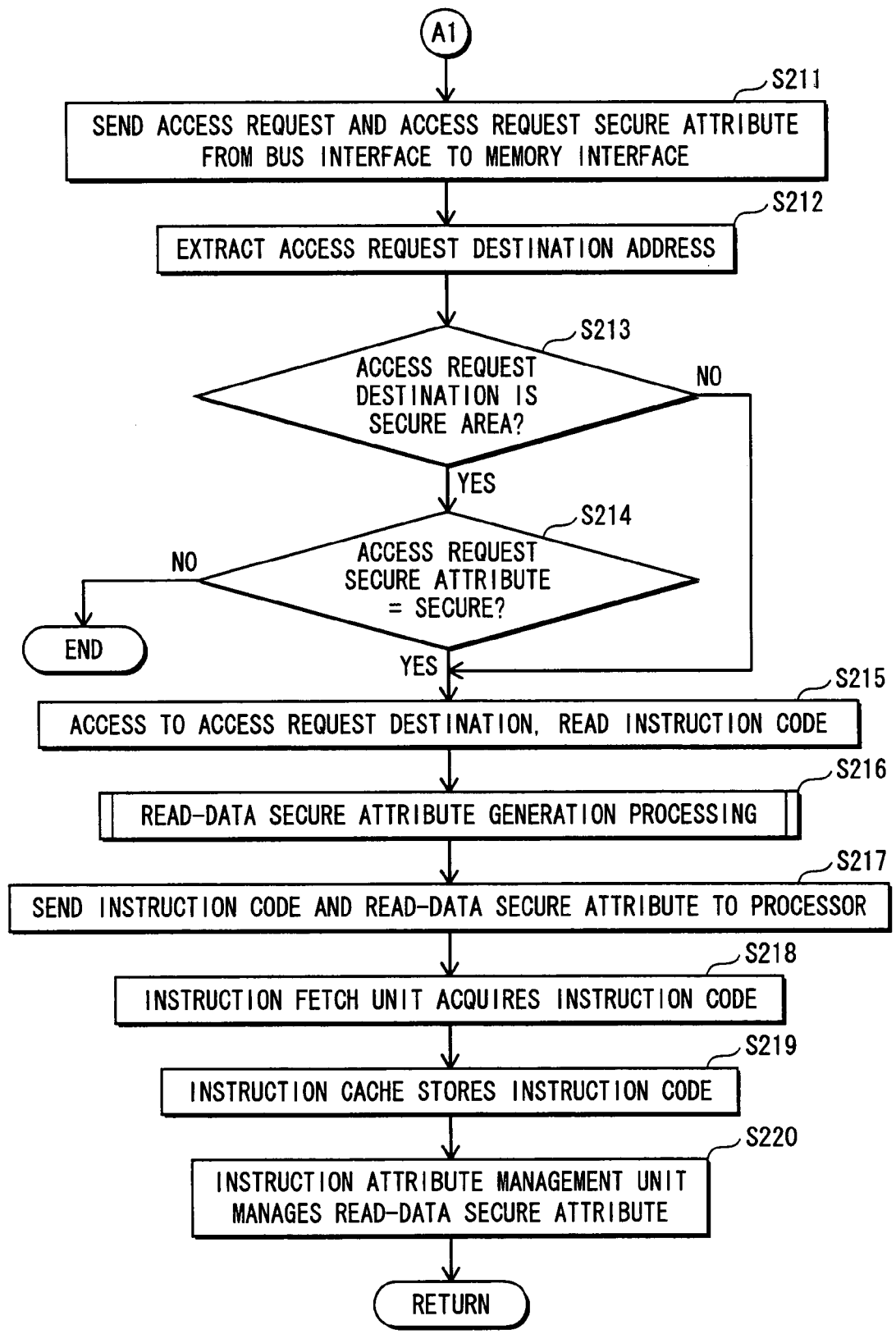
FIG. 9 is a flowchart-showing overall operations of the secure processing system 1 pertaining to an instruction fetch performed by the processor core 101, continuing from FIG. 8.

FIG. 8 and FIG. 9 are flowcharts showing overall operations of the secure processing system 1 that accompany an instruction fetch performed by the processor core 101.

The instruction fetch unit 110 of the processor core 101 issues an access request and an access request secure attribute (step S201), and the instruction access determination unit 106 receives the issued access request and access request secure attribute (step S202).

The instruction cache 102 receives the access request via the instruction access determination unit 106, and judges whether instruction code to which access has been requested is stored in the instruction cache 102 (step S203).

In the case of a cache miss-hit (step S204:NO), processing moves to step S211 and continues from there. In the case of a cache hit (step S204:YES), the instruction access determination unit 106 reads, from the attribute management table 130 managed by the instruction attribute management unit 103, the secure attribute included in the read-data secure attribute corresponding to the access destination cache line. The instruction access determination unit 106 judges whether the read secure attribute is set to "secure" or "normal".

If the secure attribute is set to "normal" (step S205:NO), processing moves to step S208. If the secure attribute is set to "secure" (step S205:YES), the instruction access determination unit 106 judges whether the access request secure attribute received in step S202 is set to "secure" or "normal".

If the access request secure attribute is set to "normal" (step S206:NO) the secure processing system 1 ends processing. If the access request secure attribute is set to "secure" (step s206:YES), the instruction cache 102 reads the instruction code from the access destination cache line, and furthermore reads, from the instruction attribute management unit 103, secure processing identification information included in the read-data secure attribute corresponding to the access destination cache line (step S207). The instruction cache 102 sends, to the processor core 101 via the instruction access determination unit 106, the read instruction code, or the instruction code and secure processing identification information (step S208).

In the case of NO in step S204, the access request and the access request secure attribute are sent from the bus interface 109 to the memory interface 20 via the bus 40 (step S211). The accessibility determination unit 203 of the memory interface 20 receives the access request and access request secure attribute via the bus master identification unit 201.

The accessibility determination unit 203 extracts the access request destination address from the access request (step S212), and furthermore acquires the secure area 1 start address, the secure area 1 end address, the secure area 2 start address, and the secure area 2 end address from the secure area management unit 202.

The accessibility determination unit 203 judges whether the access request destination address indicates the secure area 1 (3001) or the secure area 2 (3002) of the memory 30. If the access request destination address indicates an area other than the secure area 1 (3001) and the secure area 2 (3002) (step S213:NO), processing moves to step S215. If the access request destination address indicates the secure area 1 (3001) or the secure area 2 (3002) (step S213:YES), the accessibility determination unit 203 judges whether the access request secure attribute is set to "secure" or "normal".

If the access request secure attribute is set to "normal" (step S214:NO), the secure processing system 1 ends processing since access to the access request destination by the processor core 101 is denied. If the access request secure attribute is set to "secure" (step S214:YES), the accessibility determination unit 203 outputs the access request destination address to the access unit 204.

The access unit 204 accesses a position in the memory 30 that is indicated by the access request destination address, and reads the instruction code at the access position (step S215). Upon reading the instruction code, the access unit 204 outputs the access destination address of the read instruction code to the read-data secure attribute generation unit 205. The access destination address is an address that indicates the storage location of the instruction code, and the access unit 204 therefore outputs the access request destination address received from the accessibility determination unit 203 as the access destination address.

Thereafter, the read-data secure attribute generation unit 205 generates a read-data secure attribute (step S216), and sends the instruction code and generated read-data secure attribute to the processor 10 (step S217).

The instruction fetch unit 110 of the processor core 101 acquires the sent instruction code (step S218), and the instruction cache 102 acquires the sent instruction code as well (step S219). Note that if secure processing identification information is attached to the read-data secure attribute acquired from the memory interface 20, the instruction fetch unit 110 acquires the secure processing identification information along with the instruction code in step S218.

The instruction attribute management unit 103 acquires the read-data secure attribute, and manages the acquired read-data secure attribute in the attribute management table 130 (step S220).

3. Read-Data Secure Attribute Generation Processing

Figure 10:
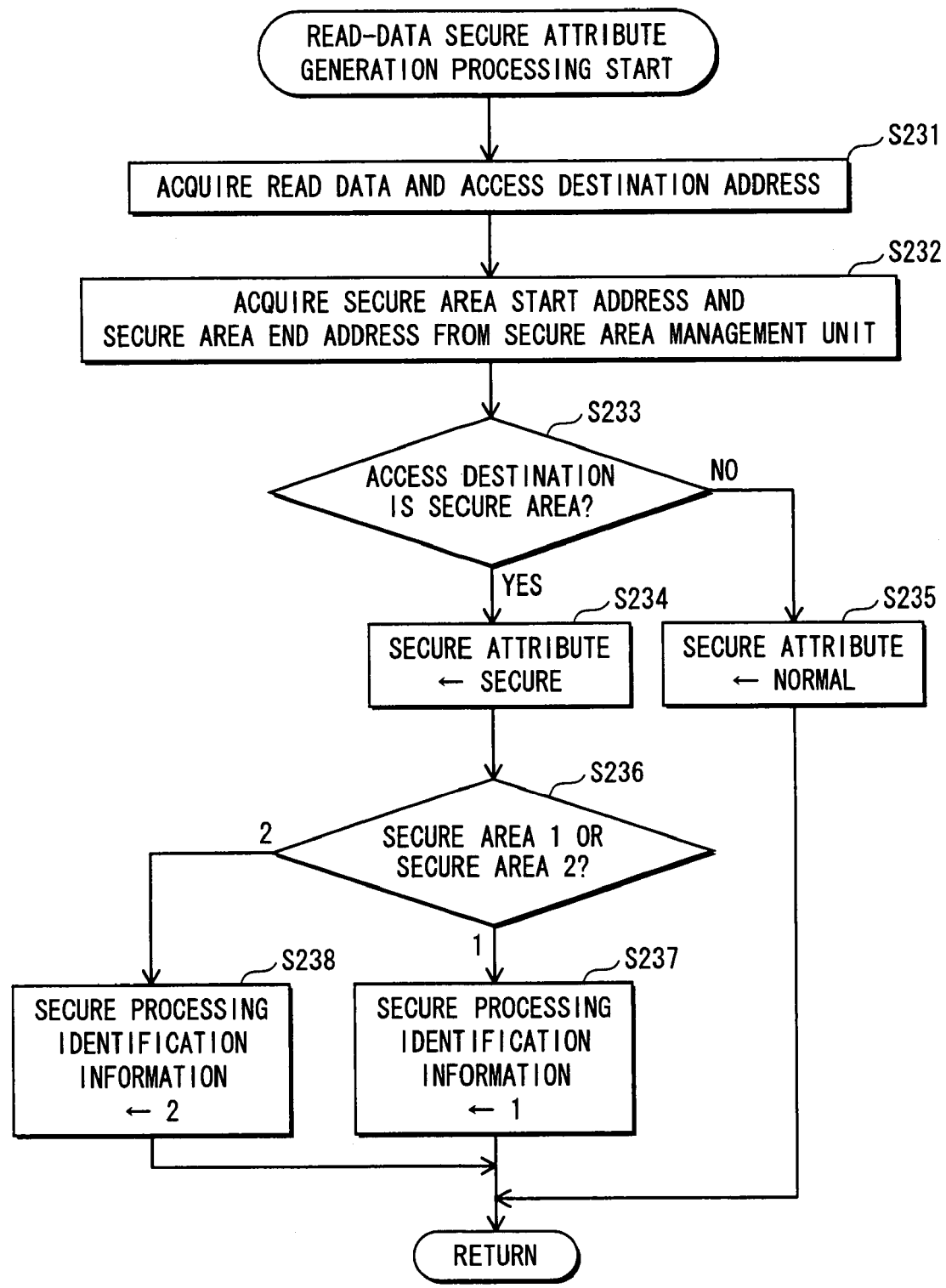
FIG. 10 is a flowchart showing operations of read-data secure attribute generation processing in the memory interface 20.

FIG. 10 is a flowchart showing operations of read-data secure attribute generation processing performed by the read-data secure attribute generation unit 205 of the memory interface 20. Note that the operations shown here are details of step S216 in FIG. 9.

The read-data secure attribute generation unit 205 acquires the read data and the access destination address from the access unit 204 (step S231). Here, the read data refers to the instruction code and data that have been read from the memory 30 by the access unit 204.

Next, the read-data secure attribute generation unit 205 acquires the secure area 1 start address, the secure area 1 end address, the secure area 2 start address, and the secure area 2 end address from the secure area management unit 202 (step S232). The read-data secure attribute generation unit 205 judges whether the access destination address indicates the secure area 1 (3001), the secure area 2 (3002), or another area (step S233).

If the access destination address indicates an area other than the secure area 1 (3001) and the secure area 2 (3002) (step S233:NO), the read-data secure attribute generation unit 205 sets the secure attribute to "normal" (step S235). If the access destination address indicates the secure area 1 (3001) or the secure area 2 (3002) (step S233:YES), the read-data secure attribute generation unit 205 sets the secure attribute to "secure" (step S234).

Furthermore, the read-data secure attribute generation unit 205 sets the secure processing identification information to 1 (step 237) if the access destination address indicates the secure area 1 (3001) (step S236:1), and sets the secure processing identification information to 2 (step S238) if the access destination address indicates the secure area 2 (3002) (step S236:2).

4. Data Fetch Processing

Figure 11:
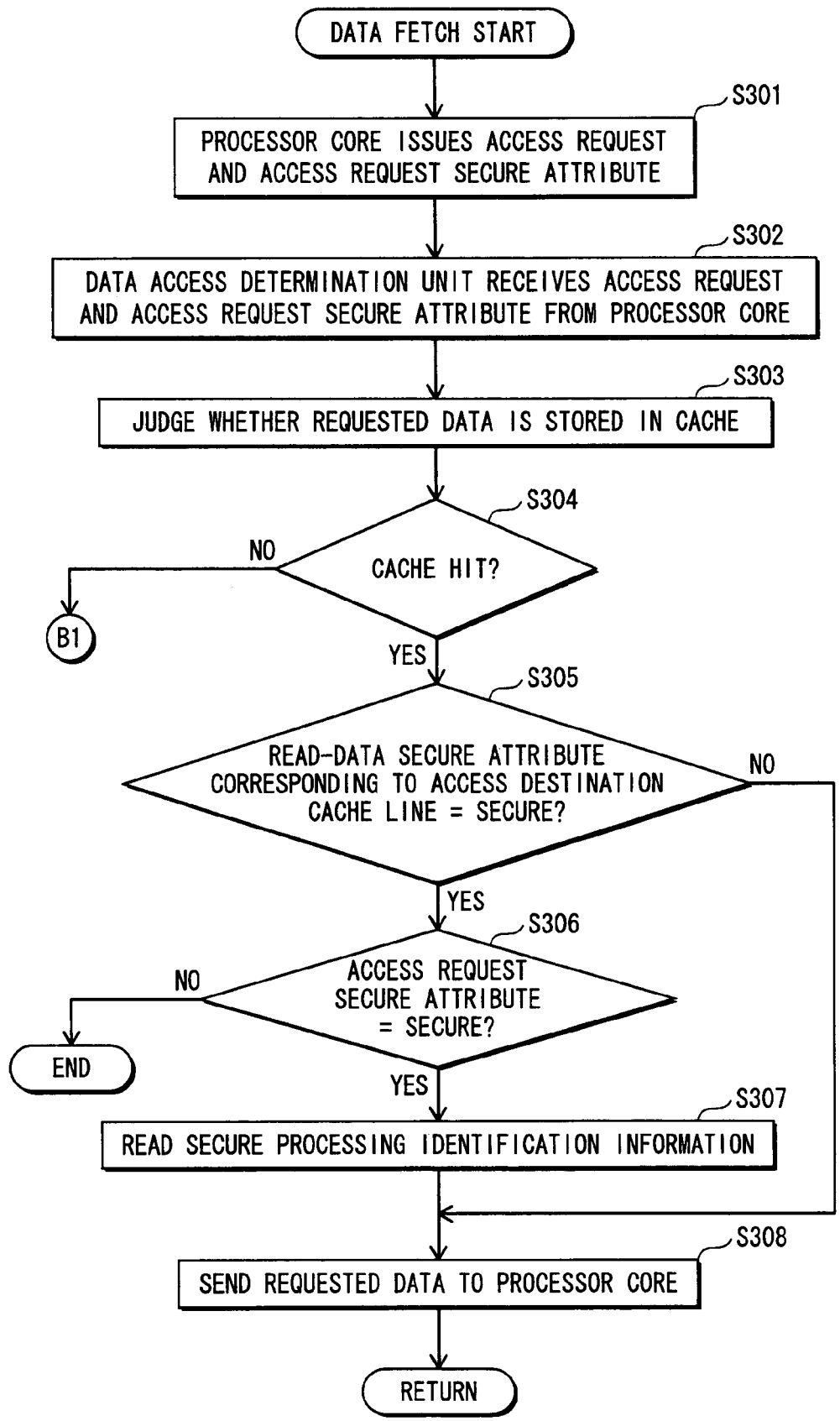
FIG. 11 is a flowchart showing overall operations of the secure processing system 1 pertaining to a data fetch performed by the processor core 101, continued in FIG. 12.
Figure 12:
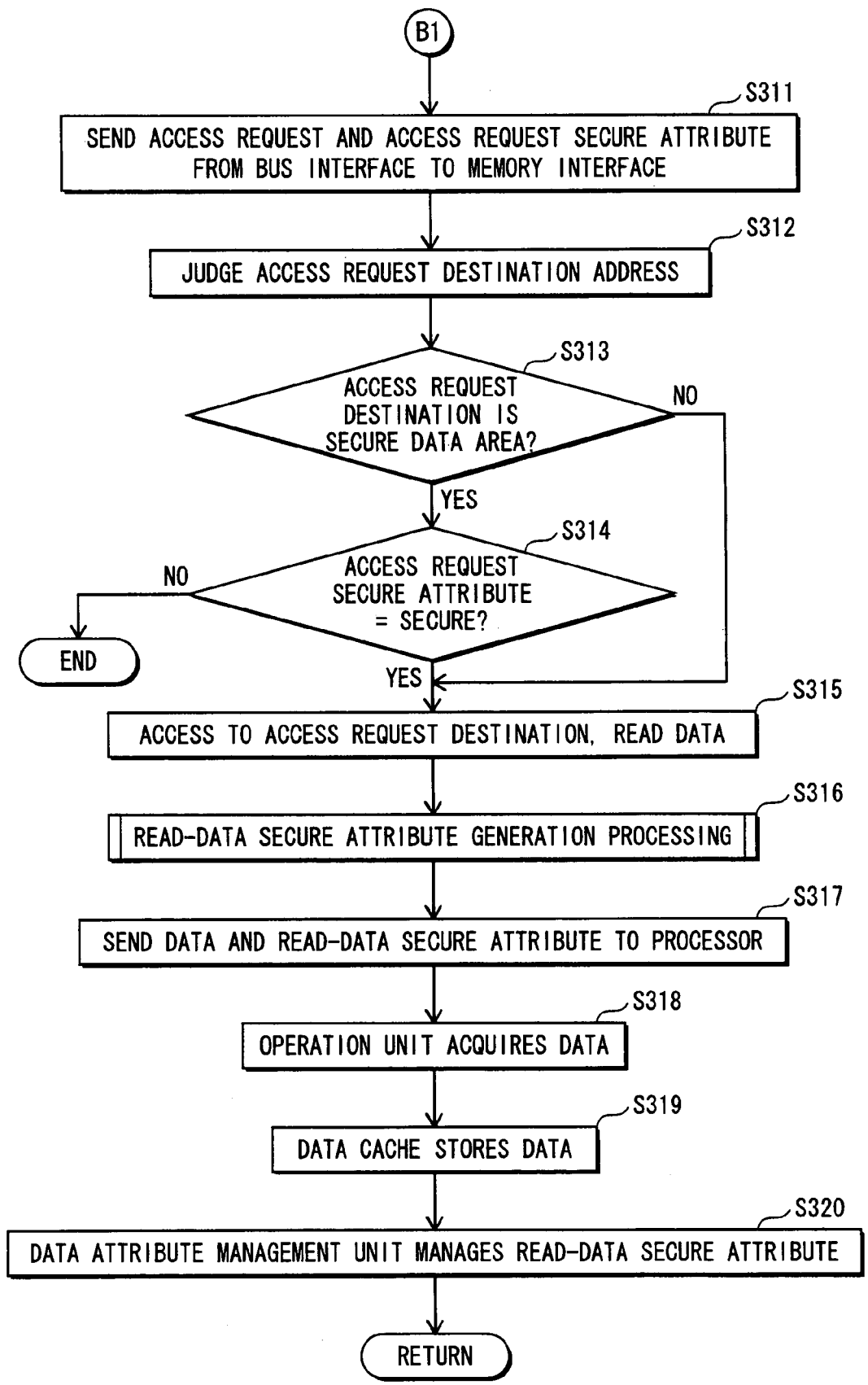
FIG. 12 is a flowchart showing overall operations of the secure processing system 1 pertaining to a data fetch performed by the processor core 101, continuing from FIG. 11.

FIG. 11 and FIG. 12 are flowcharts showing overall operations of the secure processing system 1 that accompany a data fetch performed by the processor core 101.

The memory management unit 114 of the processor core 101 issues an access request and an access request secure attribute (step S301), and the data access determination unit 107 receives the issued access request and access request secure attribute (step S302).

The data cache 104 receives the access request via the data access determination unit 107, and judges whether data to which access has been requested is stored in the data cache 104 (step S303).

In the case of a cache miss-hit (step S304:NO), processing moves to step S311 and continues from there. In the case of a cache hit (step S304:YES), the data access determination unit 107 reads, from the attribute management table managed by the data attribute management unit 105, the secure attribute included in the read-data secure attribute corresponding to the access destination cache line. The data access determination unit 107 judges whether the read secure attribute is set to "secure" or "normal".

If the secure attribute is set to "normal" (step S305:NO), processing moves to step S307. If the secure attribute is set to "secure" (step S305:YES), the data access determination unit 107 judges whether the access request secure attribute received in step S302 is set to "secure" or "normal".

If the access request secure attribute is set to "normal" (step S306:NO), the secure processing system 1 ends processing. If the access request secure attribute is set to "secure" (step S306:YES), the data cache 104 reads the data from the access destination cache line, and furthermore reads, from the data attribute management unit 105, secure processing identification information included in the read-data secure attribute corresponding to the access destination cache line (step S307). The data cache 104 sends, to the processor core 101 via the data access determination unit 107, the read data, or the data and secure processing identification information (step S308).

In the case of NO in step S304, the access request and the access request secure attribute are sent from the bus interface 109 to the memory interface 20 via the bus 40 (step S311). The accessibility determination unit 203 of the memory interface 20 receives the access request and access request secure attribute via the bus master identification unit 201.

The accessibility determination unit 203 extracts the access request destination address from the access request (step S312), and furthermore acquires the secure area 1 start address, the secure area 1 end address, the secure area 2 start address, and the secure area 2 end address from the secure area management unit 202.

The accessibility determination, unit 203 judges whether the access request destination address indicates the secure area 1 (3001) or the secure area 2 (3002) of the memory 30. If the access request destination address indicates an area other than the secure area 1 (3001) and the secure area 2 (3002) (step S313:NO), processing moves to step S315. If the access request destination address indicates the secure area 1 (3001) or the secure area 2 (3002) (step S313:YES), the accessibility determination unit 203 judges whether the access request secure attribute is set to "secure" or "normal".

If the access request secure attribute is set to "normal" (step S314:NO), the secure processing system 1 ends processing since access to the access request destination by the processor core 101 is denied. If the access request secure attribute is set to "secure" (step S314:YES), the accessibility determination unit 203 outputs the access request destination address to the access unit 204.

The access unit 204 accesses a position in the memory 30 that is indicated by the access request destination address, and reads the data at the access position (step S315). Upon reading the data, the access unit 204 outputs the read data and the access destination address of the read data to the read-data secure attribute generation unit 205. The access destination address is an address that indicates a storage location of the data, and the access unit 204 outputs the access request destination address received from the accessibility determination unit 203 as the access destination address.

Thereafter, the read-data secure attribute generation unit 205 generates a read-data secure attribute (step S316), and sends the data and generated read-data secure attribute to the processor 10 (step S317).

The operation unit 113 of the processor core 101 acquires the sent data via the memory management unit 114 (step S318), and the data cache 104 acquires the sent data as well (step S319). Note that if secure processing identification information is attached to the read-data secure attribute acquired from the memory interface 20, the operation unit 113 acquires the secure processing identification information along with the data in step S318.

The data attribute management unit 105 acquires the read-data secure attribute, and manages the acquired read-data secure attribute in the attribute management table (step S320).

5. Reversion Processing

Figure 13:
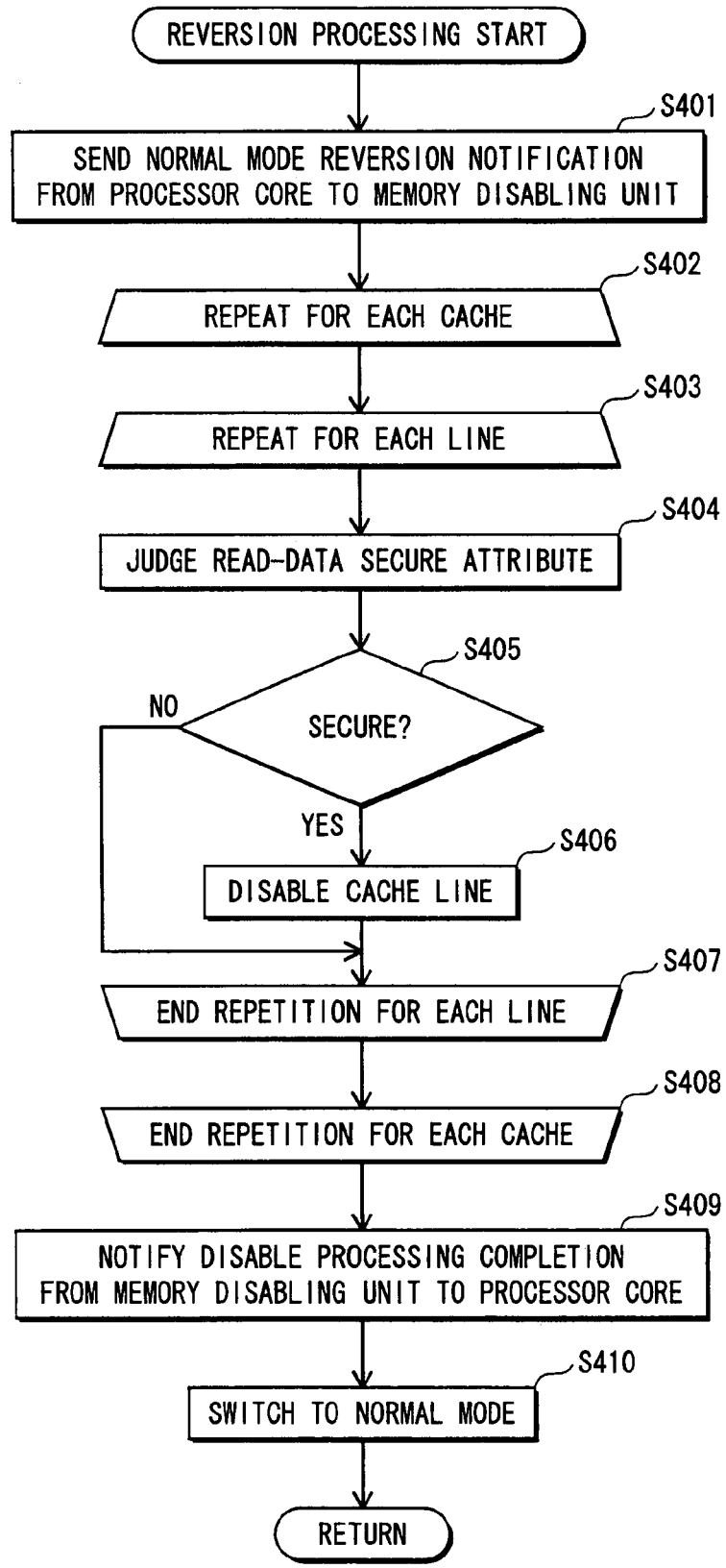
FIG. 13 is a flowchart showing operations of processing for reverting from a secure mode to a normal mode.

FIG. 13 is a flowchart showing overall operations of the secure processing system 1 that accompany reversion processing performed when the processor core 101 reverts from the secure mode to the normal mode.

The processor core 101 sends the memory disabling unit 108 a notification of reversion from the secure mode to the normal mode (step S401). The memory disabling unit 108 receives the notification from the processor core 101.

Next, the memory disabling unit 108 repeats the processing of step S402 to step S408 for each of the caches. Specifically, the memory disabling unit 108 repeats the processing of step S402 to step S408 for the instruction cache 102 and the data cache 104.

Next, the memory disabling unit 108 repeats the processing of step S403 to step S407 for each cache line. The memory disabling unit 108 refers to the instruction attribute management unit 103 and the data attribute management unit 105, and judges whether the respective secure attribute included in the read-data secure attribute of the targeted cache line is set to "secure" or "normal" (step S405) If the secure attribute is set to "normal" (step S405:NO), processing moves to step S407. If the secure attribute is set to "secure" (step S405: YES), the memory disabling unit 108 disables the cache line to put the instruction code or data stored in the cache line into an unreadable condition (step S406).

After processing on all of the cache lines has ended (step S407), and processing with respect to the instruction cache 102 and the data cache 104 has ended (step S408), the memory disabling unit 108 issues the processor core 101 a completion notification for the cache disabling processing (step S409).

Upon receiving the completion notification from the memory disabling unit 108, the processor core 101 switches the operating mode from the secure mode to the normal mode (step S410).

Embodiment 2

The following describes a secure processing system 2 as embodiment 2 of the present invention. Embodiment 1 is based on the premise that the processor has a secure mode and a normal mode, and embodiment 1 therefore cannot be applied to a processor that does not have a secure mode. The following described embodiment 2 therefore aims to provide a processor, memory interface and secure processing system that can handle secure resources, without the processor having a secure mode.

Figure 14:
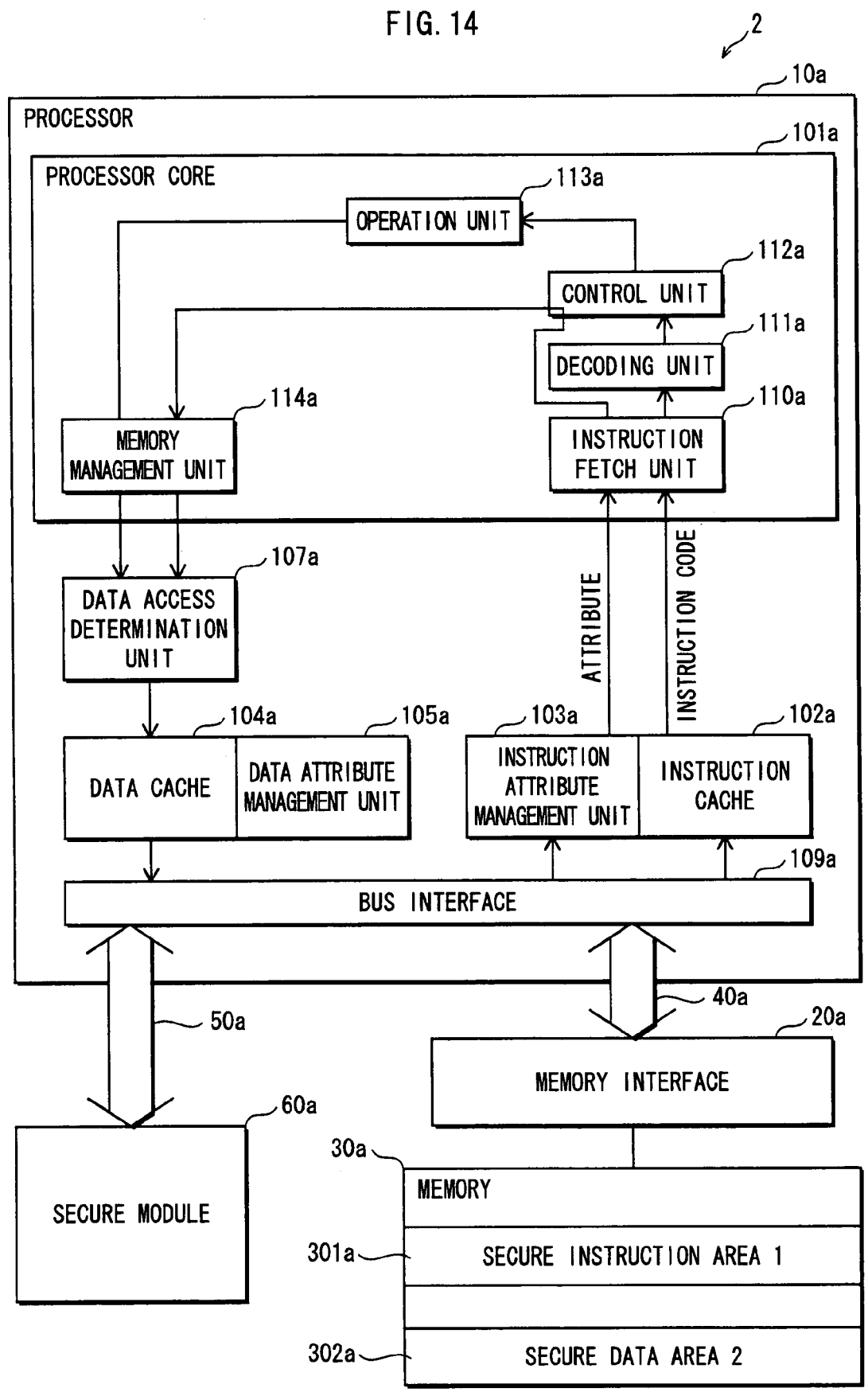
FIG. 14 shows a structure of a secure processing system 2.

FIG. 14 shows a structure of the secure processing system 2. As shown in the figure, the secure processing system 2 includes a processor 10a, a memory interface 20a, a memory 30a, a bus 40a, a bus 50a, and a secure module 60a.

Characteristic features of the secure processing system 2 are that the processor 10a operates in only the normal mode, without implementing security, and that the secure module 60a has been provided.

1. Processor 10a

As shown in FIG. 14, the processor 10a includes a processor core 101a, an instruction cache 102a, an instruction attribute management unit 103a, a data cache 104a, a data attribute management unit 105a, a data access determination unit 107a, and a bus interface 109a.

The structure of the processor 10*a* differs from that of the processor 10 in embodiment 1 in that neither an instruction access determination unit nor a memory disabling unit has been provided. The instruction access determination unit has not been provided since the processor 10*a* operates in only the normal mode, and therefore an access request secure attribute is not issued in the case of an instruction fetch. Also, the memory disabling unit has not been provided since the processor 10*a* operates in only the normal mode, and therefore processing for reverting from the secure mode to the normal mode, such as in embodiment 1, does not occur.

(1) Processor Core 101*a*

Similarly to the processor core 101 disclosed in embodiment 1, the processor core 101*a* includes an instruction fetch unit 110*a*, a decoding unit 111*a*, a control unit 112*a*, an operation unit 113*a*, and a memory management unit 114*a*. However, as mentioned above, in contrast to the processor core 101, the processor core 101*a* does not have a secure mode for performing secure processing, and therefore operates in only the normal mode.

The constituent elements of the processor core 101*a* have the same functions as the corresponding constituent elements of the processor core 101, and descriptions of the same functions have therefore been omitted. The following description centers on differences from the processor core 101.

The instruction fetch unit 110*a* of the processor core 101*a* acquires instruction code and a read data secure attribute from the instruction cache 102*a* or the memory 30*a*. Similarly to embodiment 1, the read-data secure attribute is information that is set based on the recording position of the instruction code, and is sent to the processor 10*a* along with the instruction code read from the memory 30*a* by the memory interface 20*a*.

Similarly to embodiment 1, the instruction code acquired by the instruction fetch unit 110*a* is decoded by the decoding unit 111*a*, and interpreted by the control unit 112*a*. The read-data secure attribute acquired by the instruction fetch unit 110*a* is output to the memory management unit 114*a* via the control unit 112*a*, without passing through the decoding unit 111*a*.

When a request for a data fetch becomes necessary due to the operation unit 113*a* executing the instruction, the memory management unit 114*a* sets the read-data secure attribute received from the control unit 112*a* to an access request secure attribute corresponding to an access request of the data fetch, outputs the access request and the access request secure attribute to the data access determination unit 107*a*.

Specifically, the memory management unit 114*a* sets the access request secure attribute of the data fetch to "secure" if the read-data secure attribute of the instruction code is set to "secure", and to "normal" if the read-data secure attribute of the data fetch is set to "normal".

(2) Instruction Cache 102*a* and Instruction Attribute Management Unit 103*a*

Similarly to the instruction cache 102 of embodiment 1, the instruction cache 102*a* is high-speed/low-capacity memory constituted from SRAM, and stores instruction code sent from the memory 30*a*.

Similarly to the instruction attribute management unit 103 of embodiment 1, the instruction attribute management unit 103*a* manages the read-data secure attributes of the instruction code stored in each cache line of the instruction cache 102*a*. Specifically, the instruction attribute management unit 103*a* stores an attribute management table having the same structure as the attribute management table 130 shown in FIG. 3, and manages the read-data secure attributes with use of the attribute management table.

(3) Data Cache 104*a* and Data Attribute Management Unit 105*a*

Similarly to the data cache 104 of embodiment 1, the data cache 104*a* is high-speed/low-capacity memory constituted from SRAM, and stores data sent from the memory 30*a*.

Similarly to the data attribute management unit 105 of embodiment 1, the data attribute management unit 105*a* manages the read-data secure attributes of the data stored in each cache line of the data cache 104*a*.

(4) Data Access Determination Unit 107*a*

The data access determination unit 107*a* determines whether data for which there was a cache-hit in data fetch processing performed by the memory management unit 114*a* of the processor core 101*a* is readable, according to the instruction being executed by the processor core 101*a* at that time.

Specifically, the data access determination unit 107*a* receives the access request along with the access request secure attribute from the memory management unit 114*a*. As mentioned above, the access request secure attribute has been set to either "secure" or "normal".

If the received access request secure attribute is set to "secure", the data access determination unit 107*a* determines that data whose read-data secure attribute is set to "secure" and data whose read-data secure attribute is set to "normal" are both readable.

On the other hand, if the received access request secure attribute is set to "normal", the data access determination unit 107*a* determines that only data whose read-data secure attribute is set to "normal" is readable.

(5) Bus Interface 109*a*

The bus interface 109*a* controls access to the bus 40*a* and the bus 50*a* by the processor 101*a*.

2. Memory Interface 20*a*

Similarly to the memory interface 20 shown in FIG. 6, the memory interface 20*a* includes a bus master identification unit, a secure area management unit, an accessibility determination unit, an access unit, and a read-data secure attribute generation unit. The memory interface 20*a* performs processing according to instructions received via the bus 40*a* and the bus 50*a*.

Upon receiving an access request from the bus 40*a* or the bus 50*a*, the bus master identification unit identifies the bus master that issued the received access request, and outputs a result of the identification to the accessibility determination unit. Note that in the present embodiment, although only the processor 10*a* is mentioned as a bus master, if the memory interface 20*a* receives access requests to the memory 30*a* from two or more bus masters other than the processor 10*a*, the bus master identification unit identifies the bus masters by providing dedicated ports for the bus masters.

The secure area management unit stores a secure instruction area start address and a secure instruction area end address for a secure instruction area 301*a* provided in the memory 30*a*, and a secure data area start address and a secure data area end address for a secure data area 302*a* also in the memory 30*a*.

If the instruction indicates an instruction fetch, the accessibility determination unit judges whether access to the secure instruction area 301*a* can be performed, according to whether the bus master is the processor core 101*a*. Specifically, access to the secure instruction area 301*a* can be performed if the result received from the bus master identification unit is that the bus master is the processor core 101*a*, and access to the secure instruction area 301*a* cannot be performed if the result received from the bus master identification unit is that the bus master is not the processor core 101*a*.

Also, similarly to embodiment 1, if the instruction indicates a data fetch, the accessibility determination unit receives an access request secure attribute from the bus master, and therefore judges whether access to the secure data area 302a can be performed according to the received access request secure attribute. Specifically, access to the secure data area 302a can be performed if the access request secure attribute is set to "secure", but cannot be performed if the access request secure attribute is set to "normal".

Descriptions of the functions of the access unit and the read-data secure attribute generation unit have been omitted since they are the same as in embodiment 1.

3. Memory 30a

Similarly to the memory 30 of embodiment 1, the memory 30a is constituted from SDRAM. As shown in FIG. 14, the memory 30a includes the secure instruction area 301a and the secure data area 302a.

The secure instruction area 301a is an area that stores confidential instruction code, and is accessible only by access performed by the processor core 101a. The secure data area 302a is an area that stores confidential data, and is accessible only by secure attribute-attached access performed by the processor core 101a.

4. Bus 40a and Bus 50a

The bus 40a is a communication pathway between the processor 10a and the memory interface 20a. Write data, instructions and access requests are transmitted from the bus interface 109a of the processor 10a to the memory interface 20a via the bus 40a. Also, read data and read-data secure attributes are transmitted from the memory interface 20a to the bus interface 109a of the processor 10a via the bus 40a.

The bus 50a is a communication pathway between the processor 10a and the secure module 60a. Write data, instructions, access requests, and access request secure attributes are transmitted from the bus interface 109a of the processor 10a to the secure module 60a via the bus 50a. Also, read data is transmitted from the secure module 60a to the bus interface 109a of the processor 10a via the bus 50a.

5. Secure Module 60a

The secure module 60a is a module pertaining to secure processing, and specific examples of such a module include an encryption/decryption unit for encrypting and decrypting content with use of private key information, and a timer that manages a secure time period for license management.

The secure module 60a receives an access request and an access request secure attribute from the processor core 101a via the bus 50a. The access request secure attribute is set to "secure" or "normal", where "secure" indicates that the access request arose due to the execution of confidential instruction code, and where "normal" indicates that the access request arose due to the execution of non-confidential instruction code.

In order to ensure security, the secure module 60a permits access only when the access request has arisen by the execution of confidential instruction code.

Accordingly, upon receiving the access request and the access request secure attribute from the processor core 101a, the secure module 60a judges the setting of the access request secure attribute. If the access request secure attribute is set to "secure", the secure module 60a enables the access request received from the processor core 101a and performs processing. If the access request secure attribute is set to "normal", the secure module 60a disables the access request received from the processor core 101a, and does not perform processing.

Operations

The following describes operations of the secure processing system 2 with reference to flowcharts shown in FIG. 15 to FIG. 19.

1. Overall Operations of the System

Figure 15:
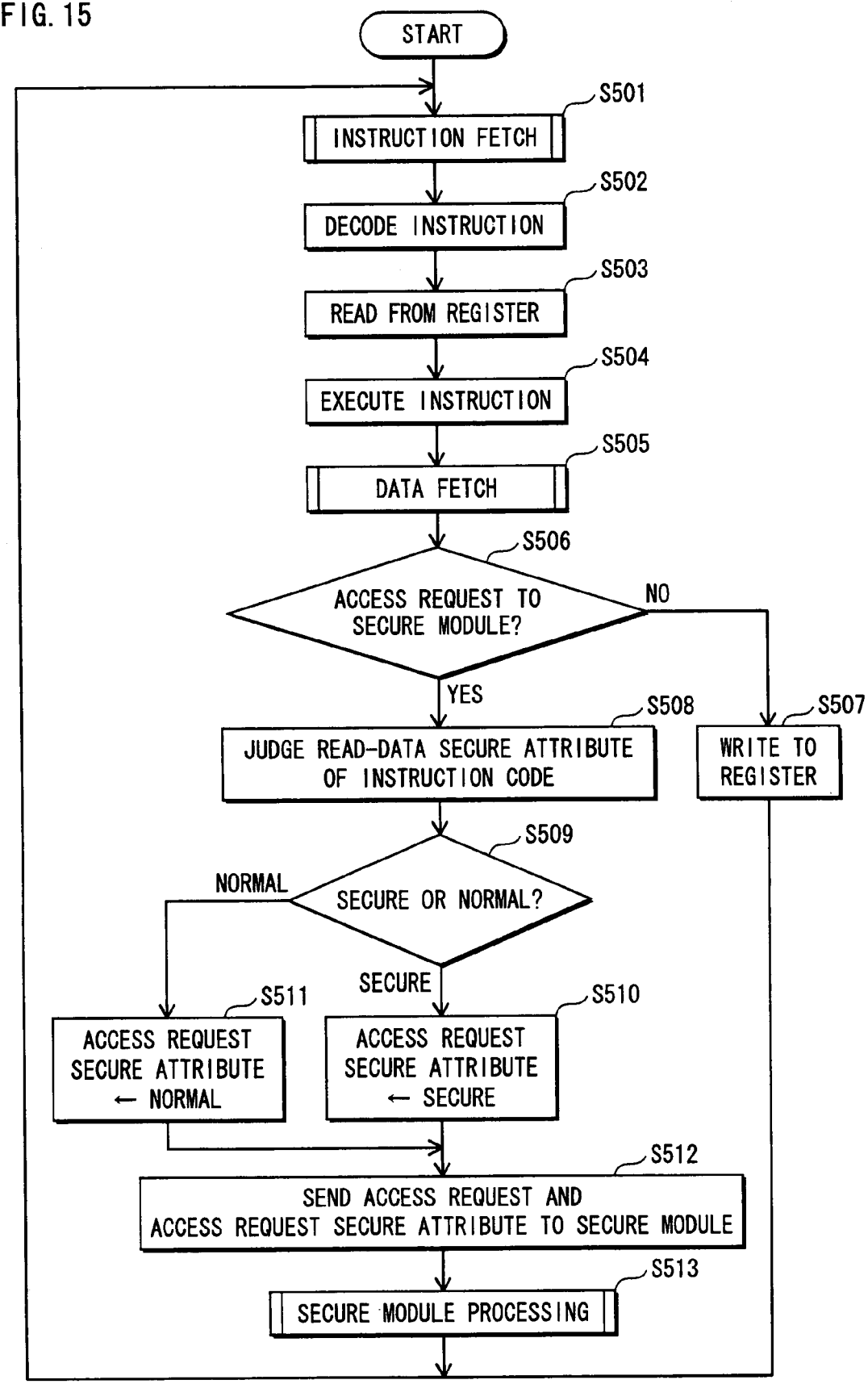
FIG. 15 is a flowchart showing overall operations of the secure processing system 2.

FIG. 15 is a flowchart showing overall operations of the secure processing system 2.

First, the instruction fetch unit 110a of the processor core 101a fetches instruction code (step S501), thereby acquiring the instruction code and a read-data secure attribute. The instruction fetch unit 110a stores the fetched instruction code in a prefetch queue.

The decoding unit 111a retrieves the instruction code from the prefetch queue, and converts the retrieved instruction code to low-level code. The resulting low-level code is stored in an instruction queue. The control unit 112a receives the low-level code from the instruction queue, and interprets the received low-level code (step S502).

The operation unit 113a reads a register operand from a register file (step S503). The operation unit 113a shifts the operand and generates an ALU result. If the instruction is a load or a store, the operation unit 113a executes the instruction by calculating a memory address or the like (step S504). If a data access is necessary, the memory management unit 114a issues an access request and an access request secure attribute, and reads data from the data cache 104a or the memory 30a (step S505).

Note that the read-data secure attribute acquired during the instruction fetch of step S501 is input by the instruction fetch unit 110a to the memory management unit 114a via the control unit 112a, without passing through the decoding unit 111a. The memory management unit 114a sets the read-data secure attribute as the access request secure attribute of a data fetch, and issues the access request secure attribute of the data fetch to the data access determination unit 107a.

Also, as a result of the instruction execution of step S504, whether access to the secure module 60a has been requested is determined (step S506), and if access to the secure module 60a has not been requested (step S506:NO), the operation unit 113a writes the data loaded from the data cache 104a or the memory 30a and a result generated by the instruction back to the register file (step S507), and the processing returns to step S501 and continues from there.

If access to the secure module 60a has been requested (step S506:YES), the memory management unit 114a receives, from the control unit 112a, a read-data secure attribute corresponding to the instruction code executed in step S504, and judges whether the received read-data secure attribute is set to "secure" or "normal" (step S508). If the read-data secure attribute is set to "secure" (step S509:SECURE), the memory management unit 114a sets the access request secure attribute to "secure" (step S510). If the read-data secure attribute is set to "normal" (step S509:NORMAL), the memory management unit 114a sets the access request secure attribute to "normal" (step S511).

The memory management unit 114a sends the access request and the access request secure attribute generated in step S510 or step S511 to the secure module 60a via the bus interface 109a and the bus 50a (step S512), and the secure module 60a performs processing according to the received access request (step S513). Thereafter, processing returns to step S501 and continues from there.

2. Instruction Fetch Processing Operations

Figure 16:
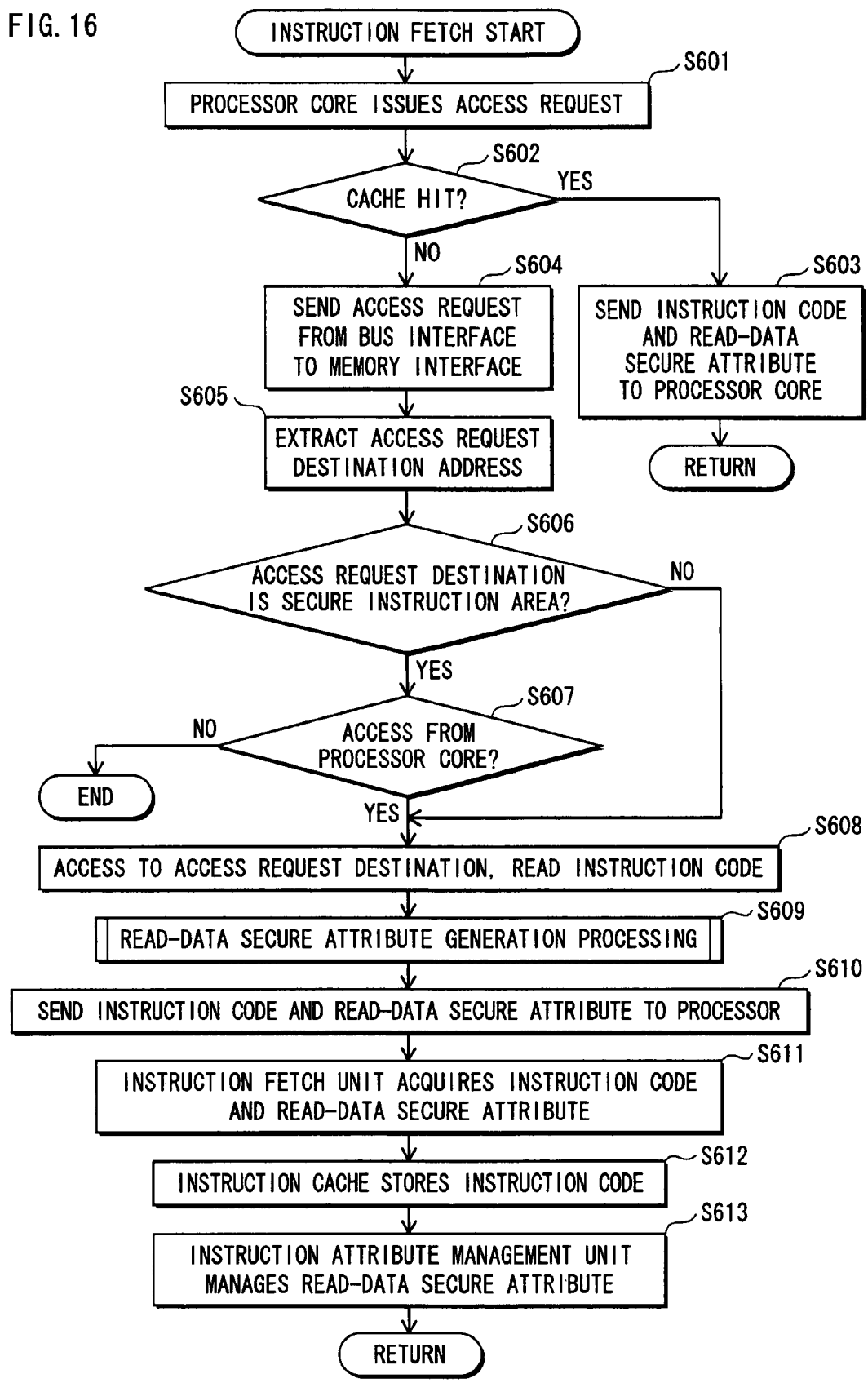

FIG. 16 is a flowchart showing overall operations of the secure processing system 2 that accompany an instruction fetch performed by the processor core 101a.

The instruction fetch unit 110a of the processor core 101a issues an access request (step S601), and the instruction cache 102a receives the access request and judges whether the instruction code to which access has been requested is stored in the instruction cache 102a (step S602).

In the case of a cache hit (step S602:YES), the instruction cache 102a reads the instruction code from the access destination cache line, and sends the read instruction code and a corresponding read-data secure attribute to the processor core 101a (step S603). In the case of a cache miss-hit (step S602: NO), the access request is send from the bus interface 109a to the memory interface 20a via the bus 40a (step S604)

Upon receiving the access request, the bus master identification unit of the memory interface 20a identifies the bus master that issued the received access request, and outputs the identification result to the accessibility determination unit.

The accessibility determination unit extracts an access request destination address from the access request (step S605), and furthermore acquires the secure instruction area start address and secure instruction area end address from the secure area management unit.

The accessibility determination unit judges whether the access request destination address indicates the secure instruction area 301a of the memory 30a. If the access request destination address indicates an area other than the secure instruction area 301a (step S606:NO), processing moves to step S608. If the access request destination address indicates the secure instruction area 301a (step S606:YES), the accessibility determination unit judges whether the identification result received from the bus master identification unit is that the bus master is the processor core 101a.

If the bus master is not the processor core 101a (step S607:NO), the secure processing system 2 ends processing. If the bus master is the processor core 101a (step S607:YES), the accessibility determination unit outputs the access request destination address to the access unit.

The access unit accesses a position in the memory 30a indicated by the access request destination address, and reads the instruction code at the position (step S608). Upon reading the instruction code, the access unit outputs the read instruction code and an access destination address to the read-data secure attribute generation unit. The access destination address is an address that indicates the storage location of the instruction code, and the access unit therefore outputs the access request destination address received from the accessibility determination unit as the access destination address.

Thereafter, the read-data secure attribute generation unit generates a read-data secure attribute (step S609), and sends the instruction code and generated read-data secure attribute to the processor 10a (step S610).

The instruction fetch unit 110a of the processor core 101a acquires the instruction code and read-data secure attribute (step S611), and the instruction cache 102a also acquires the instruction code (step S612). The instruction attribute management unit 103a acquires the read-data secure attribute, and manages the acquired read-data secure attribute in the attribute management table (step S613).

Note that a description of operations by which the memory interface 20a performs read-data secure attribute generation processing in step S609 has been omitted since they are the same as the operations shown in FIG. 10.

3. Data Fetch Processing Operations

Figure 17:
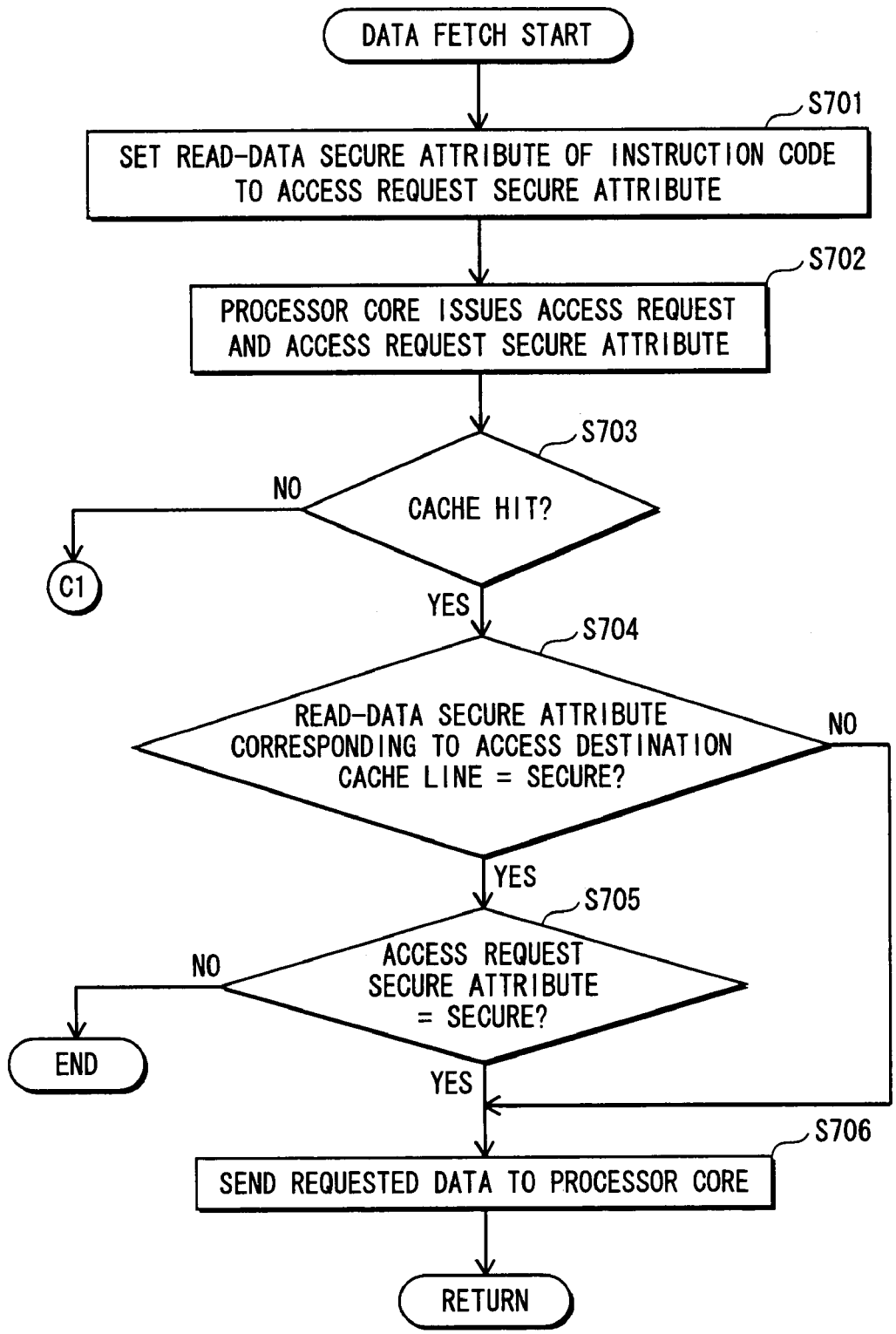
FIG. 17 is a flowchart showing overall operations of the secure processing system 2 pertaining to a data fetch performed by the processor core 101a, continued in FIG. 18.
Figure 18:
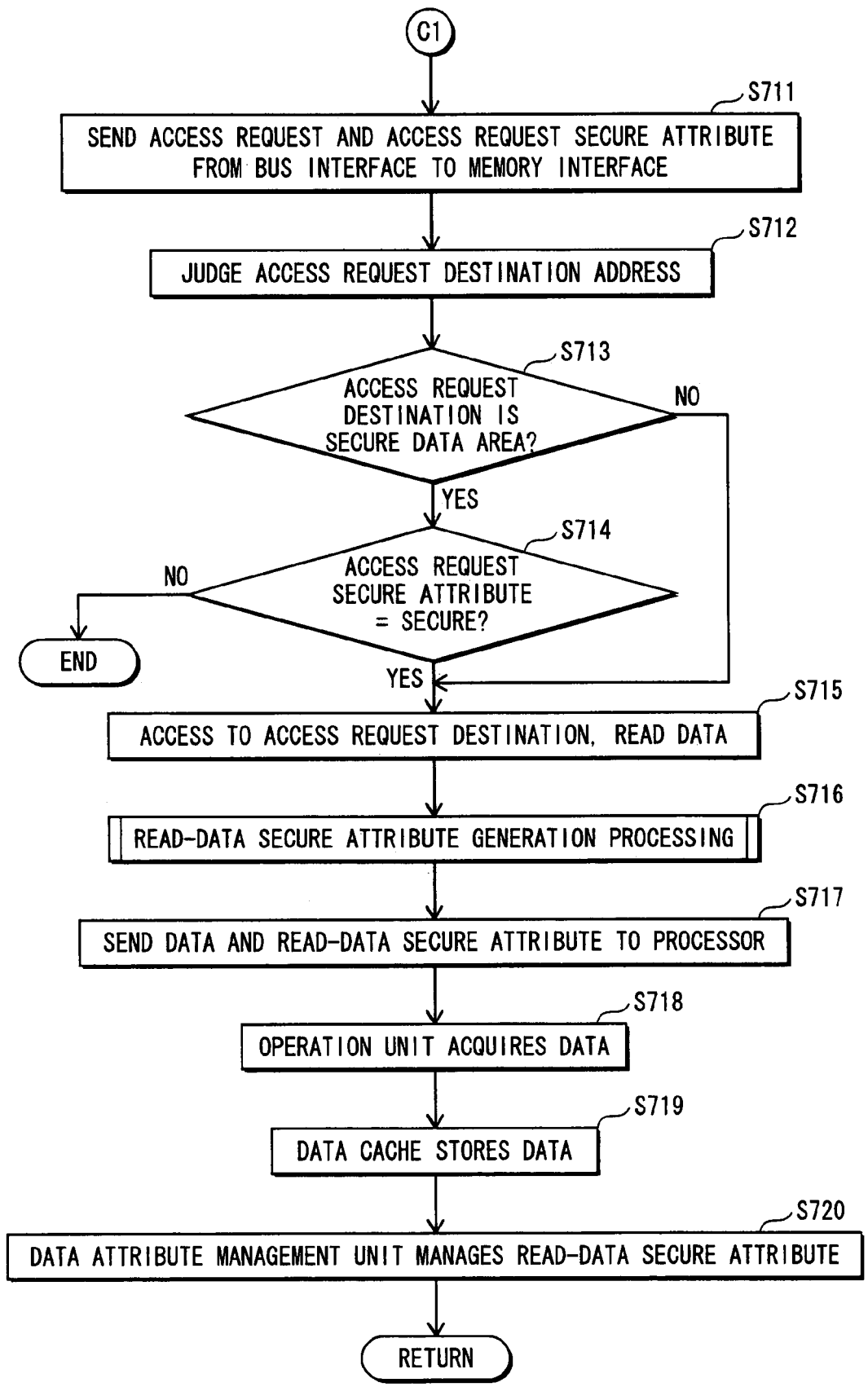
FIG. 18 is a flowchart showing overall operations of the secure processing system 2 pertaining to a data fetch performed by the processor core 101a, continuing from FIG. 17.

FIG. 17 and FIG. 18 are flowcharts showing overall operations of the secure processing system 2 that accompany a data fetch performed by the processor core 101a.

The memory management unit 114a of the processor core 101a sets the read-data secure attribute of the instruction code as the access request secure attribute of the data fetch (step S701), and issues an access request and the access request secure attribute (step S702), which are received by the data access determination unit 107a.

The data cache 104a receives the access request via the data access determination unit 107a, and judges whether data to which access has been requested is stored in the data cache 104a (step S703).

In the case of a cache miss-hit (step S703:NO), processing moves to step S711 and continues from there. In the case of a cache hit (step S703:YES), the data access determination unit 107a reads, from the attribute management table managed by the data attribute management unit 105a, the read-data secure attribute corresponding to the access destination cache line. The data access determination unit 107a judges whether the read-data secure attribute is set to "secure" or "normal".

If the read-data secure attribute is set to "normal" (step S704:NO), processing moves to step S706. If the read-data secure attribute is set to "secure" (step S704:YES), the data access determination unit 107a judges whether the access request secure attribute received from the memory management unit 114a is set to "secure" or "normal".

If the access request secure attribute is set to "normal" (step S705:NO), the secure processing system 2 ends processing. If the access request secure attribute is set to "secure" (step S705:YES), the data cache 104a reads the data from the access destination cache line, and sends the read data to the processor core 101a via the data access determination unit 107a (step S706).

In the case of NO in step S703, the access request and the access request secure attribute are sent from the bus interface 109a to the memory interface 20a via the bus 40a (step S711). The accessibility determination unit of the memory interface 20a receives the access request and access request secure attribute via the bus master identification unit.

The accessibility determination unit extracts the access request destination address from the access request, and furthermore acquires the secure data area start address and the secure data area end address from the secure area management unit.

The accessibility determination unit judges whether the access request destination address indicates the secure data area 302a of the memory 30a (step S712). If the access request destination address indicates an area other than the secure data area 302a (step S713:NO), processing moves to step S715. If the access request destination address indicates the secure data area 302a (step S713:YES), the accessibility determination unit judges whether the access request secure attribute is set to "secure" or "normal".

If the access request secure attribute is set to "normal" (step S714:NO), the secure processing system 2 ends processing. If the access request secure attribute is set to "secure" (step S714:YES), the accessibility determination unit outputs the access request destination address to the access unit.

The access unit accesses a position in the memory 30a that is indicated by the access request destination address, and reads the data at the access position (step S715). Upon reading the data, the access unit outputs the read data and the access destination address of the read data to the read-data secure attribute generation unit. The access destination address is an address that indicates a storage location of the data, and the access unit outputs the access request destination address received from the accessibility determination unit as the access destination address.

Thereafter, the read-data secure attribute generation unit generates a read-data secure attribute (step S716), and sends the data and generated read-data secure attribute to the processor 10a (step S717).

The operation unit 113a of the processor core 101a acquires the sent data via the memory management unit 114a (step S718), and the data cache 104a acquires the sent data as well (step S719) The data attribute management unit 105a acquires the read-data secure attribute, and manages the acquired read-data secure attribute in the attribute management table (step S720).

Note that a description of operations by which the memory interface 20a performs read-data secure attribute generation processing in step S716 has been omitted since they are the same as the operations shown in FIG. 10.

4. Operations of the Secure Module 60a

Figure 19:
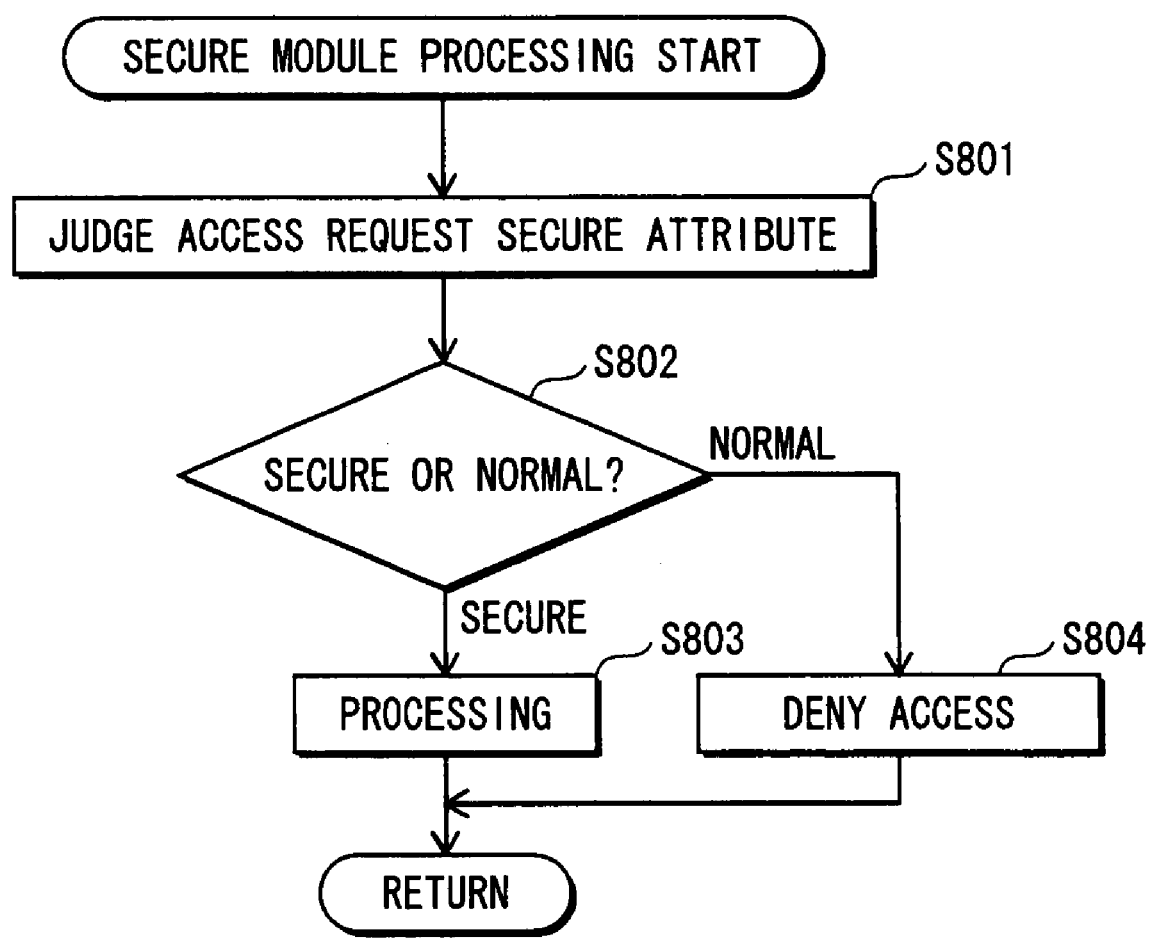

FIG. 19 is a flowchart showing operations of the secure module 60a. Note that the operations shown here are details of step S513 in FIG. 15.

Upon receiving an instruction, an access request and an access request secure attribute from the processor core 101a, the secure module 60a judges whether the received access request secure attribute is set to "secure" or "normal" (step s801). If the access request secure attribute is set to "secure" (step S802:SECURE), the secure module 60a performs processing according to the received instruction (step S803), and if the access request secure attribute is set to "normal", the secure module 60a denies the access (step S804), and ends processing.

Specific Example by Encryption DMA

Figure 20:
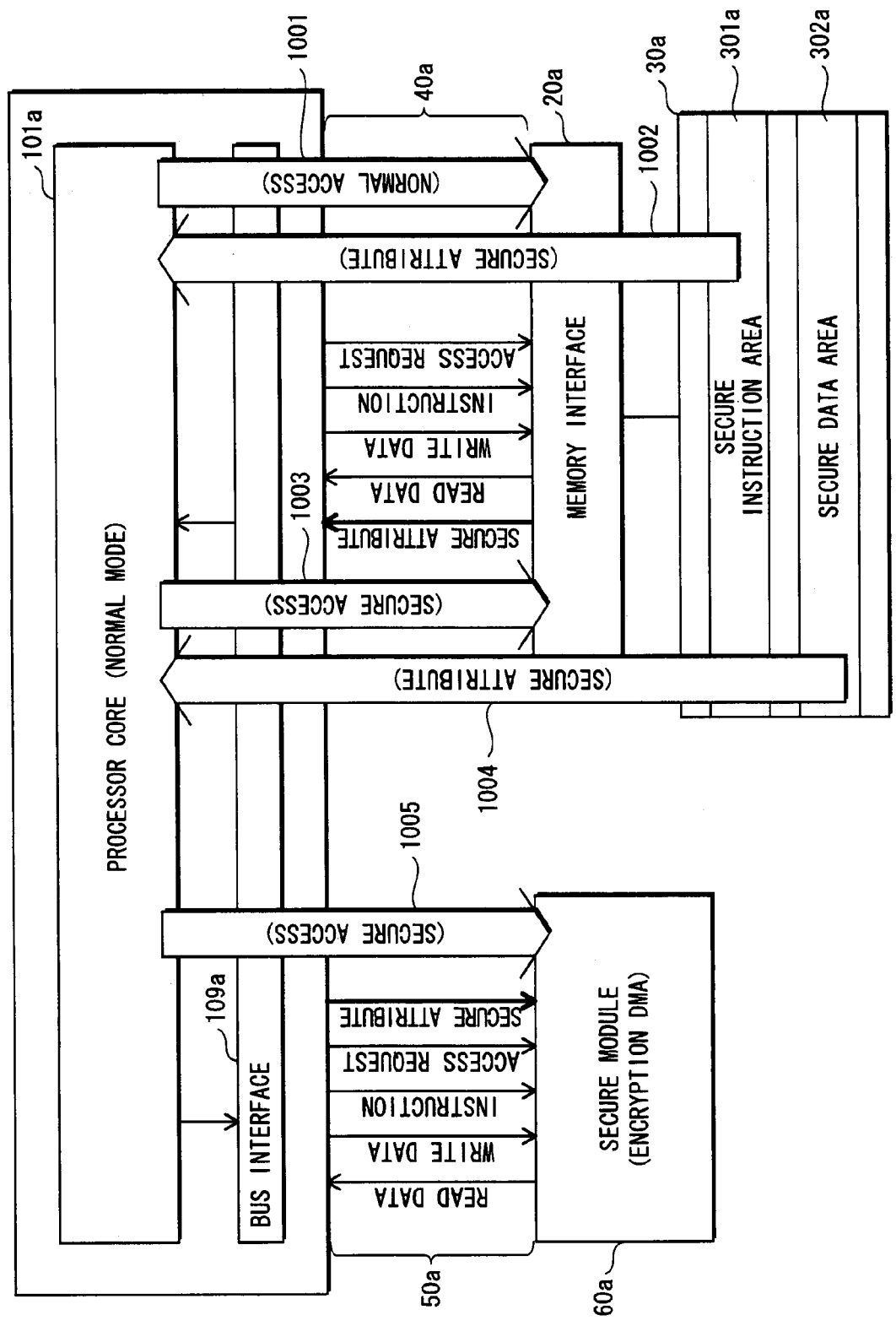

The following describes specific operations of a bus access in embodiment 2 in the case of the secure module 60a being encryption DMA (direct memory access), with reference to FIG. 20. Encryption DMA is a module that performs data transfers between an encryption function block (not depicted) and the memory 30a, and in this case includes a DMA controller.

Also, as previously mentioned, the secure instruction area 301a of the memory 30a is accessible only by access performed by the processor core 101a, and the secure data area 302a is accessible only by a secure attribute-attached access performed by the processor core 101a.

(S1) The processor core 101a issues an instruction indicating a fetch of instruction code for encryption DMA register configuration, and an access request 1001. Due to the processor core 101a lacking a secure mode, and therefore operating only in the normal mode, the access request 1001 output from the processor core 101a is a normal access. Note that the instruction code for encryption DMA register configuration is secure instruction code that is stored in the secure instruction area 301a.

(S2) Upon receiving the instruction indicating access to the secure instruction area 301a and the access request 1001, the memory interface 20a causes the bus master identification unit to check that the access request 1001 has been issued from the processor core 101a, and acquires the instruction code for encryption DMA register configuration from the secure instruction area 301a. The read-data secure attribute generation unit of the memory interface 20a then sets a read-data secure attribute 1002 to "secure", and sends the instruction code and a read-data secure attribute 1002 to the processor core 101a.

(S3) Next, an instruction indicating a data fetch for register configuration and an access request 1003 are issued in the processor core 101a. At this time, an access request secure attribute is set to the same "secure" indicated by the read-data secure attribute that has been received from the memory interface 20a in S2, and the access request secure attribute is attached to the access request 1003. In other words, the processor core 101a issues a secure access request.

(S4) Upon receiving the instruction indicating an access to the secure data area 302a and the access request 1003, the memory interface 20a causes the accessibility determination unit to check that the access request secure attribute is set to "secure", and acquires the data for the register configuration from the secure data area 302a. Next, the read-data secure attribute generation unit of the memory interface 20a sets a read-data secure attribute 1004 to "secure", and sends the data and a read-data secure attribute 1004 to the processor core 101a.

(S5) The processor core 101a issues an instruction requesting register configuration and an access request 1005 to the encryption DMA. At this time, an access request secure attribute is set to the same "secure" indicated by the read-data secure attribute acquired from the memory interface 20a in (S4), and the access request secure attribute is attached to the access request 1005.

The encryption DMA receives the instruction requesting registration configuration and the access request 1005, checks that the access request secure attribute is set to "secure", and performs registration configuration based on the data received from the processor core 101a.

Other Variations

Although described above based on embodiments 1 and 2, the present invention is of course not limited to the aforementioned embodiments. Cases such as the following are also included in the present invention.

(1) Although the internal memory of the processors in embodiments 1 and 2 is described as cache memory, cache memory is only one specific example. The internal memory of the present invention is not limited to cache memory.

(2) Although the memory 30 includes two secure areas, namely the secure area 1 (3001) and the secure area 2 (3002), in embodiment 1, the memory may include any number of secure areas in the present invention.

(3) The present invention also includes a case in which a portion or all of the function blocks of the processor 10, the processor 10a, the memory interface 20, and the memory interface 20a in the above embodiments are realized by an LSI, which is an integrated circuit. The function blocks may each be made into a single and separate chip, or may be made into a single chip including a portion or all portions thereof. The LSI referred to here is also called an IC, a system LSI, a super LSI, or an ultra LSI depending on the degree of integration.

Also, the integration is not limited to LSI implementation, but instead may be realized by a dedicated circuit. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(4) The present invention also includes combinations of the above embodiments and the above variations.

INDUSTRIAL APPLICABILITY

A processor and a secure processing system of the present invention can be used as a copyright protection mechanism for content in industries that distribute content. Also, the processor and the secure processing system can be used in industries that manufacture and sell an audio/video device including the processor or the secure processing system.

The invention claimed is:

1. A processor that, during operation, switches between a secure mode of performing processing with use of secure information and non-secure information and a normal mode of performing processing with use of the non-secure information, the processor comprising:

an internal memory operable to have stored therein a plurality of secure information pieces and non-secure information pieces acquired from an external memory, a plurality of attribute information pieces each corresponding to a different stored information piece and indicating whether the corresponding information piece is one of the secure information pieces or the non-secure information pieces, and a plurality of processing specification information pieces each corresponding to a different one of the stored secure information pieces and being for specifying in which of a plurality of secure processes the corresponding secure information piece is to be used; and a disabling unit operable to, before a switch in a case of switching from the secure mode to the normal mode, specify, according to the attribute information pieces, a secure information piece from among the secure information pieces and non-secure information pieces stored in the internal memory, and disable only the specified secure information piece.

2. The processor of claim 1, wherein the internal memory is a cache memory that manages information in cache line units, and manages each of the attribute information pieces in a different cache line unit of the cache memory.

3. A secure processing system comprising:

an external memory including a secure area composed of a plurality of sub-secure areas, and operable to store a plurality of secure information pieces and non-secure information pieces, the secure information pieces being stored in the secure area;

a memory interface including a read unit operable to read an information piece from the external memory, a position information storage unit operable to have stored therein sub-secure area position information for specifying a position of each of the sub-secure areas, a judgement unit operable to, according to the sub-secure area position information, judge whether the information piece read by the read unit is one of the secure information pieces or the non-secure information pieces, and if the read information piece is one of the secure information pieces, also judge from which of the sub-secure areas the information piece has been read, and an attribute information generation unit operable to, if the read information piece has been judged to be one of the secure information pieces, generate attribute information indicating security, and generate specification information for specifying the sub-secure area in which the read information piece was stored, and if the read information piece has been judged to be one of the non-secure information pieces, generate attribute information indicating non-security; and a processor that, during operation, switches between a secure mode of performing processing with use of secure information and non-secure information and a normal mode of performing processing with use of the non-secure information, the processor including an internal memory operable to have stored therein the plurality of secure information pieces and non-secure information pieces acquired from the external memory, and a disabling unit operable to, before a switch in a case of switching from the secure mode to the normal mode, specify a secure information piece from among the secure information pieces and non-secure information pieces stored in the internal memory, by referencing the attribute information received from the memory interface, and disable only the specified secure information piece.

* * * * *